United States Patent
Coulombe

(10) Patent No.: US 8,019,371 B2
(45) Date of Patent: Sep. 13, 2011

(54) MULTI-USERS REAL-TIME TRANSCODING SYSTEM AND METHOD FOR MULTIMEDIA SESSIONS

(75) Inventor: Stéphane Coulombe, Brossard (CA)

(73) Assignee: Vantrix Corporation, Montreal, Quebec (CA)

( * ) Notice: Subject to any disclaimer, the term of this patent is extended or adjusted under 35 U.S.C. 154(b) by 645 days.

(21) Appl. No.: 12/097,950

(22) PCT Filed: Dec. 27, 2006

(86) PCT No.: PCT/CA2006/002134
§ 371 (c)(1),
(2), (4) Date: Oct. 7, 2008

(87) PCT Pub. No.: WO2007/073602
PCT Pub. Date: Jul. 5, 2007

(65) Prior Publication Data
US 2010/0004014 A1 Jan. 7, 2010

Related U.S. Application Data

(60) Provisional application No. 60/754,194, filed on Dec. 28, 2005.

(51) Int. Cl.
*H04B 7/00* (2006.01)
(52) U.S. Cl. .......... 455/518; 455/519; 455/90.2
(58) Field of Classification Search .......... 455/517–520, 455/553.1, 90.2, 78, 79, 500, 426.1, 412.1, 455/414.1, 416, 420; 370/352, 389, 338, 370/328
See application file for complete search history.

(56) References Cited

U.S. PATENT DOCUMENTS

| | | | | |
|---|---|---|---|---|
| 2003/0028643 | A1* | 2/2003 | Jabri | 709/226 |
| 2003/0235184 | A1* | 12/2003 | Dorenbosch et al. | 370/352 |
| 2006/0052127 | A1 | 3/2006 | Wolter | |
| 2006/0052130 | A1* | 3/2006 | Choksi | 455/552.1 |

FOREIGN PATENT DOCUMENTS

WO 2005/026866 3/2005

OTHER PUBLICATIONS

F. Andreasen et al., Media Gateway Control Protocol (MGCP) Version 1.0, Cisco Systems, Jan. 2003, 210 P., IETF RFC.
C. Groves et al., Gateway Control Protocol Version 1, Nortel Networks Editors, Jun. 2003, 213 p., IETF RFC.

(Continued)

*Primary Examiner* — Dominic E Rego
(74) *Attorney, Agent, or Firm* — Victoria Donnelly; IP-MEX Inc.

(57) ABSTRACT

A method an system for establishing a multi-user communication session, having a session description, between terminals with incompatible media characteristics, in which users with terminals having incompatible media characteristics are invited to participate in the communication session. A transcoding session is set up for enabling transcoding between the incompatible media characteristics of the terminals based on information about the terminals of the users having accepted the invitation, this information comprising the media characteristics of the users' terminals. The session description is established according to the transcoding session and, during the communication session, media streams from the terminal of one user are transcoded according to the transcoding session and the transcoded media streams are transmitted according to the session description to the other users participating in the communication session, using the media characteristics of the terminals of those other users.

66 Claims, 15 Drawing Sheets

OTHER PUBLICATIONS

3GPP2 and its Organizational Partners, IP Multimedia Call Control Protocol Based on SIP and SDP—Stage 3, All-IP Core Network Multimedia Domain, Dec. 2003, 304 p., 3GPP2 TSG-X.

3GPP2 and its Organizational Partners, IP Multimedia Subsystem (IMS)—Stage 2, All-IP Core Network Multimedia Domain, Dec. 2003, 179 p., 3GPP2 TSG-X.

3GPP2 and its Organizational Partners, Push-to-Talk over Cellular (PoC) System Requirements, Sep. 29, 2005, 21 p., 3GPP2 TSG-X.

Open Mobile Alliance, Push to talk over Cellular (POC)—User Plane, OMA-TS_PoC-UserPlane-V1_0, Oct. 6, 2005, 167 p., Open Mobile Alliance Ltd.

Open Mobile Alliance, Push to talk over Cellular (POC)—Control Plane Document, OMA-TS-PoC-ControlPlane-V1_0, Oct. 6, 2005, 284 p., Open Mobile Alliance Ltd.

Open Mobile Alliance, Push to talk over Cellular (PoC)—Architecture, OMA-AD_PoC-V1_0-20050805-C, Aug. 5, 2005, 167p., Open Mobile Alliance Ltd.

E. Burger et al., Media Services in the IMS: Evolution for Innovation, 2006, 12p., Cantata Technology.

3rd Generation Partnership Project, Technical Specification Group Core Network, IP Multimedia (IM) session handling; IM call model; Stage 2, Dec. 2007, 60 p., 3GPP.

3rd Generation Partnership Project, Technical Specification Group Services and System Aspects, IP Multimedia Subsystem (IMS); Stage 2, Mar. 2008, 226 p., 3GPP.

3rd Generation Partnership Project, Technical Specification Group Services and System Aspects, Packet switched conversational multimedia applications; Default codecs (Release 7), Mar. 2008, 16 p., 3GPP.

M. Handley et al., SDP: Session Description Protocol, ISI/LBNL, Apr. 1998, 48 p., IETF RFC.

ITU-T Recommendation H.248.1, Gateway control protocol: Version 3, Series H: Audiovisual and Multimedia Systems, Infrastructure of audiovisual services—Communication procedures, Sep. 2005, 206 p., International Telecommunication Union.

3rd Generation Partnership Project, Technical Specification Group Core Network and Terminals, IP multimedia call control protocol based on Session Initiation Protocol (SIP) and Session Description Protocol (SDP); Stage 3 (Release 7), Mar. 2008, 477 p., 3GPP.

\* cited by examiner

| 402 | Request-URI sip:PoCConferenceFactoryURI.networkA.net |
| --- | --- |
| 404 | SIP HEADERS |
| 406 | P-Preferred-Identity: "PoC User A" <sip:PoC-UserA@networkA.net> |
| 408 | Accept-Contact: *;+g.poc.talkburst; require;explicit |
| 410 | User-Agent: PoC-client/OMA1.0 Acme-Talk5000/v1.01 |
| 412 | Contact: <sip:PoC-ClientA.networkA.net>;+g.poc.talkburst |
| 414 | Supported: Timer |
| 416 | Session-Expires: 1800;refresher=uac |
| 418 | Allow: INVITE,ACK,CANCEL,BYE,REFER,MESSAGE,SUBSCRIBE,NOTIFY, PUBLISH |
| 420 | SDP PARAMETERS |
| 422 | c= IN IP6 1000:900:800:700:600:efdf:2edf:3ece |
| 424 | m= audio 3456 RTP/AVP 97 98 |
| 426 | a= rtpmap:97 AMR |
| 428 | a= rtpmap: 98 EVRC/8000 |
| 430 | a= rtcp:5560 |
| 432 | m= application 2000 udp TBCP |
| 434 | a= fmtp:TBCP queuing=1; tb_priority=2; timestamp=1 |

Fig. 4

MULTI-USERS REAL-TIME TRANSCODING SYSTEM AND METHOD FOR MULTIMEDIA SESSIONS

CROSS REFERENCE TO RELATED APPLICATIONS

This application claims the benefit of U.S. Provisional Application No. 60/754,194, filed on Dec. 28, 2005 and entitled, "REAL-TIME TRANSCODING ARCHITECTURE FOR PoC", which is incorporated herein in its entirety.
[0]

FIELD OF THE INVENTION

The present invention generally relates to a system and method for establishing a multi-user communication session. More specifically, but not exclusively, the present invention is concerned with a multiparty real-time transcoding system and method for push to talk over cellular multimedia sessions.

BACKGROUND OF THE INVENTION

The Push to Talk Over Cellular (PoC) service allows mobile users to create group sessions where participants can have voice and data communications on a one-to-one or one-to-many basis [1]. The voice communications are similar to walkie-talkie services where the terminals have dedicated 'talk' buttons. Only one person can talk at a given time and each talk burst is relatively short, for example, it lasts for a few seconds. Users can also exchange instant messages. Soon the talk bursts will evolve to bursts of voice and video streams, and the instant messages will contain rich media content such as audio, video, text, animation, etc.

The Push to Talk Over Cellular (PoC) service specifications is defined by the Open Mobile Alliance (OMA). It is based on the Session Initiation Protocol (SIP) in the Third Generation Partnership Project (3GPP or 3GPP2) Internet Protocol Multimedia Subsystem (IMS) architecture. More specifically, the PoC service is built on top of a SIP/IP core which can meet the specifications of the 3GPP IP Multimedia Sub-system (IMS) [4, 5] or the 3GPP2 IMS [6, 7].

The overall PoC architecture for the generic case comprises a plurality of PoC clients, each one of them connected to its own Participating PoC Function (over its own network), participating to a common session controlled by a central Controlling PoC Function. All the PoC Functions are connected to the central Controlling PoC Function.

It is important to note that the Controlling PoC Function is responsible for managing who has permission to talk (i.e. who has the permission to send audiovisual media or multimedia packets) at any given time and for copying media packets from one source to multiple destinations. The Participating PoC function cannot perform those operations.

Because of the diversity of the terminals and networks, interoperability issues are arising. For instance, 3GPP mandates the use of AMR (Adaptive Multi-Rate) narrowband speech codec as the default speech codec in the PoC service [2]. 3GPP also mandates the support of the AMR wideband speech codec, if the User Equipment on which the PoC Client is implemented uses a 16 kHz sampling frequency for the speech. On the other hand, 3GPP2 mandates the EVRC (Enhanced Variable Rate Coded) speech codec as the default speech codec [3]. Therefore, 3GPP and 3GPP2 PoC terminals supporting AMR and EVRC audio codecs respectively would not be able to establish a PoC session together, due to incompatibilities. The same incompatibilities are expected to arise for the instant messages containing video and media. To solve this problem, transcoding is required. Transcoding allows converting, in a network element, from one format to another to meet each participant's terminal capabilities.

Since the PoC service is built on top of a 3GPP/3GPP2 IMS SIP/IP core, the media is controlled and processed by the MRFC/MRFP (Media Resource Function Controller/Media Resource Function Processor) [4, 8], which uses the H.248/MGCP (Media Gateway Control Protocol) protocol [9-11] for communication purposes. However these specifications are quite complex and developing a solution which conforms to those protocols requires a huge effort. Also, H.248/MGCP is being criticized and challenged because it is complex, costly and it is the only IMS key system component which is not SIP-based. For those reasons, there is a need to address the problem of transcoding in the PoC application with a more generic framework, which is not limited to MRFC/MRFP and H.248/MGCP. Also, although the MRFC/MRFP functionalities and interfaces are well-defined, their usage in a PoC context is not defined.

In the PoC standard, the need for transcoding is recognized but no detailed solutions are provided. It is said in [1] that transcoding may be performed by both the Controlling PoC Function (CPF) and/or the Participating PoC Function (PPF) without further details. It is therefore important to develop a transcoding architecture that supports various configurations and use cases. In some cases, it is also highly desirable that transcoding be added in a transparent fashion, so that it can work and fit with the already deployed PoC equipment.

In summary, there is a need for a generic solution supporting transcoding in the PoC context. The solution should be compatible with the existing PoC architecture and protocols so as to be accepted and integrated into the standard schemes such as 3GPP, 3GPP2 and OMA. Also the solution needs to be flexible to be able to adapt to different equipment deployment scenarios and constraints.

OBJECTS OF THE INVENTION

A non-limitative object of the present invention is therefore to provide a multiparty real-time transcoding system and method for push and talk over cellular (PoC) multimedia sessions.

SUMMARY OF THE INVENTION

More specifically, in accordance with the present invention, there is provided a method for establishing a multi-user communication session, having a session description, between terminals having incompatible media characteristics, the method comprising: inviting users with terminals having incompatible media characteristics to participate in the communication session; setting up a transcoding session enabling transcoding between the incompatible media characteristics of the terminals based on information about the terminals of the users having accepted the invitation, this information comprising the media characteristics of the users' terminals; establishing the session description according to the transcoding session; and during the communication session, transcoding media streams from the terminal of one user according to the transcoding session and transmitting the transcoded media streams according to the session description to the other users participating in the communication session, using the media characteristics of the terminals of said other users.

The present invention also relates to a system for establishing a multi-user communication session, having a session description, between terminals having incompatible media characteristics, the system comprising: means for inviting users with terminals having incompatible media characteristics to participate in the communication session; means for setting up a transcoding session enabling transcoding between the incompatible media characteristics of the terminals based on information about the terminals of the users having accepted the invitation, this information comprising the media characteristics of the users' terminals; means for establishing the session description according to the transcoding session; and during the communication session, means for transcoding media streams from the terminal of one user according to the transcoding session and transmitting the transcoded media streams according to the session description to the other users participating in the communication session, using the media characteristics of the terminals of said other users.

The present invention still further relates to a system for establishing a multi-user communication session, having a session description, between terminals having incompatible media characteristics, the system comprising: a network element for inviting users with terminals having incompatible media characteristics to participate in the communication session; a transcoding server for setting up a transcoding session enabling transcoding between the incompatible media characteristics of the terminals based on information about the terminals of the users having accepted the invitation, this information comprising the media characteristics of the users' terminals; wherein: the transcoding server establishes the session description according to the transcoding session; and during the communication session, the transcoding server transcodes media streams from the terminal of one user according to the transcoding session and transmits the transcoded media streams according to the session description to the other users participating in the communication session, using the media characteristics of the terminals of said other users.

The foregoing and other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 4 illustrates a SDP session description contained within a SIP INVITE request when setting up a session;

DETAILED DESCRIPTION

Figure 1:
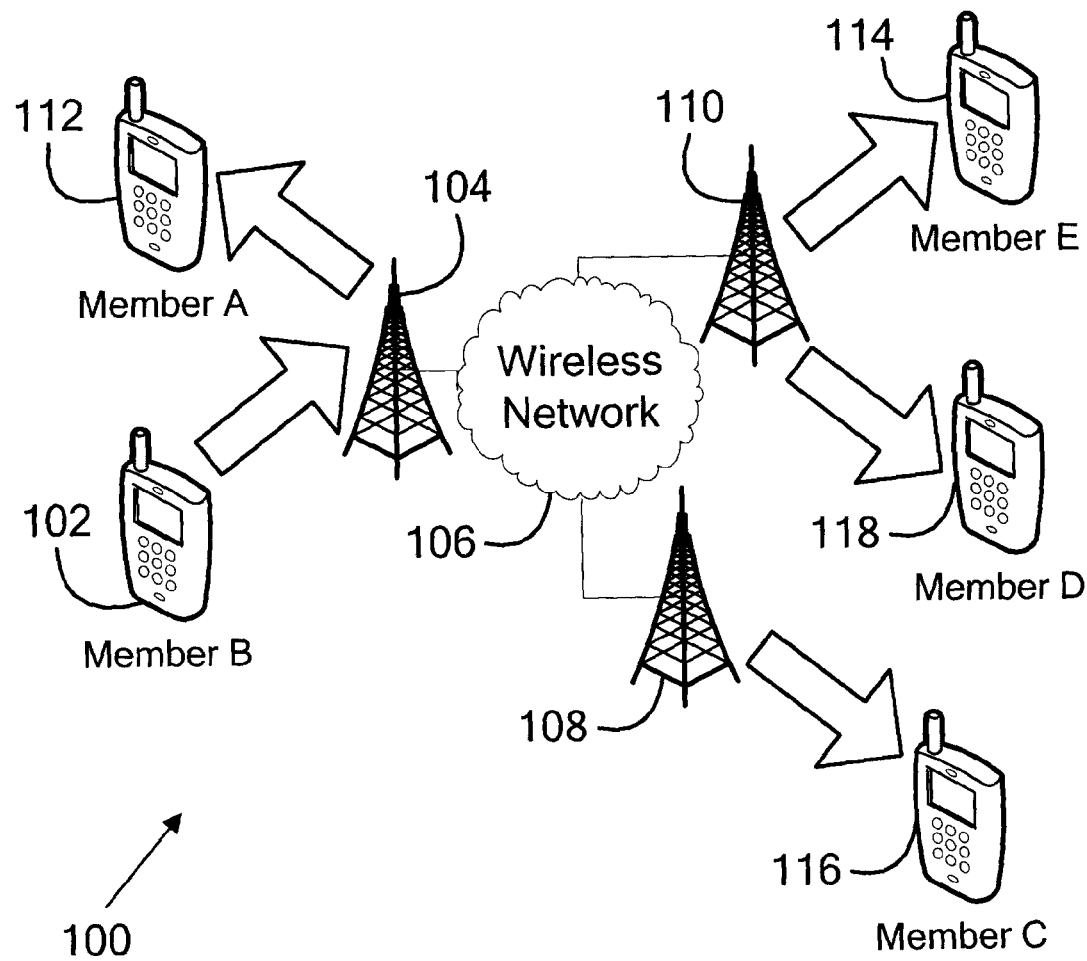
FIG. 1 is a schematic diagram illustrating an "one-to-many" group session with voice transmission in a PoC architecture.

In the following description, reference is made to the accompanying drawings which form a part hereof, and in which are shown various non-restrictive illustrative embodiments in which the invention may be practiced. It is to be understood that other embodiments may be utilized, and structural and operational changes may be made without departing from the scope of the present invention.

In the following description, the present invention will be described in the context of the Push to Talk Over Cellular (PoC). However the present invention is not restricted to the PoC application and may be applied in other multiparty multimedia architectures where only one participant has the permission to talk at any given time; this permission being managed by a central network element. The central network element may be any central element to the session including a Controlling PoC Function and a Multipoint Control Unit (MCU). The permission to talk may also be, in a more general context, any audiovisual media stream which is derived from one or many users and distributed to all users (e.g. a video mosaic made from the video streams of several users or a mixing of several audio streams). It is to be noted also that although reference is made to talk burst and permission to talk, talking refers generally to the permission to send media streams to other participants, whether the media streams are audio, video, text, graphics or of other type. Therefore the term 'talk burst' will be used although the term 'media burst' may be more appropriate. This usage does not limit the scope of the invention, which applies to all types and combinations of media. Finally, a user or party participating in the communication session, within the scope of the present invention, is not limited to a person participating to the multimedia session using a terminal or any other device but also includes any autonomous device participating to the conference such as a monitoring or recording device.

Generally, the illustrative embodiments of the present invention presents a system and method for enabling interoperability between terminals supporting different media characteristics (types, formats, codecs, or attributes) which otherwise would not be able to establish a multi-user multimedia session where only one user has the permission to send media streams (such as audio and video) at any given time. Although interoperability is the main concern, the proposed system may also perform transcoding for convenience. For instance, a user's terminal may support audio but the user may prefer the media to be converted into text if he/she is in a meeting, where the use of audio is not allowed. Such usages are considered within the scope of the present invention and included in the use of the term incompatibilities in this invention. The system and method enable interoperability by customizing session offerings to each user and modifying, as required, the media streams between users to comply with each participant's terminal capabilities and even preferences. The system and method addresses multiparty multimedia sessions and can be applied to the context of PoC multimedia sessions. The present specification describes several embodiment alternatives. The choice of the specific embodiment depends on the constraints associated with deploying a specific service. In some cases, performance may be of chief importance while in other cases, it may be transparent transcoding.

One of the possible applications of interest of the present invention is in a PoC service, as illustrated in FIG. 1. This service allows mobile users to create group sessions where participants can have voice and data communications on an one-to-one or one-to-many basis [1]. FIG. 1 shows a PoC system 100 where a mobile terminal 102, having the permission to talk, sends a media stream via the transmitting antenna 104, the wireless network 106 and the receiving antennas 108 and 110 to terminals 112, 114, 116, and 118. A central element (not shown) in the wireless network 106 is responsible for the duplication and transport of the media streams to the destination terminals 112, 114, 116, and 118.

Figure 2:
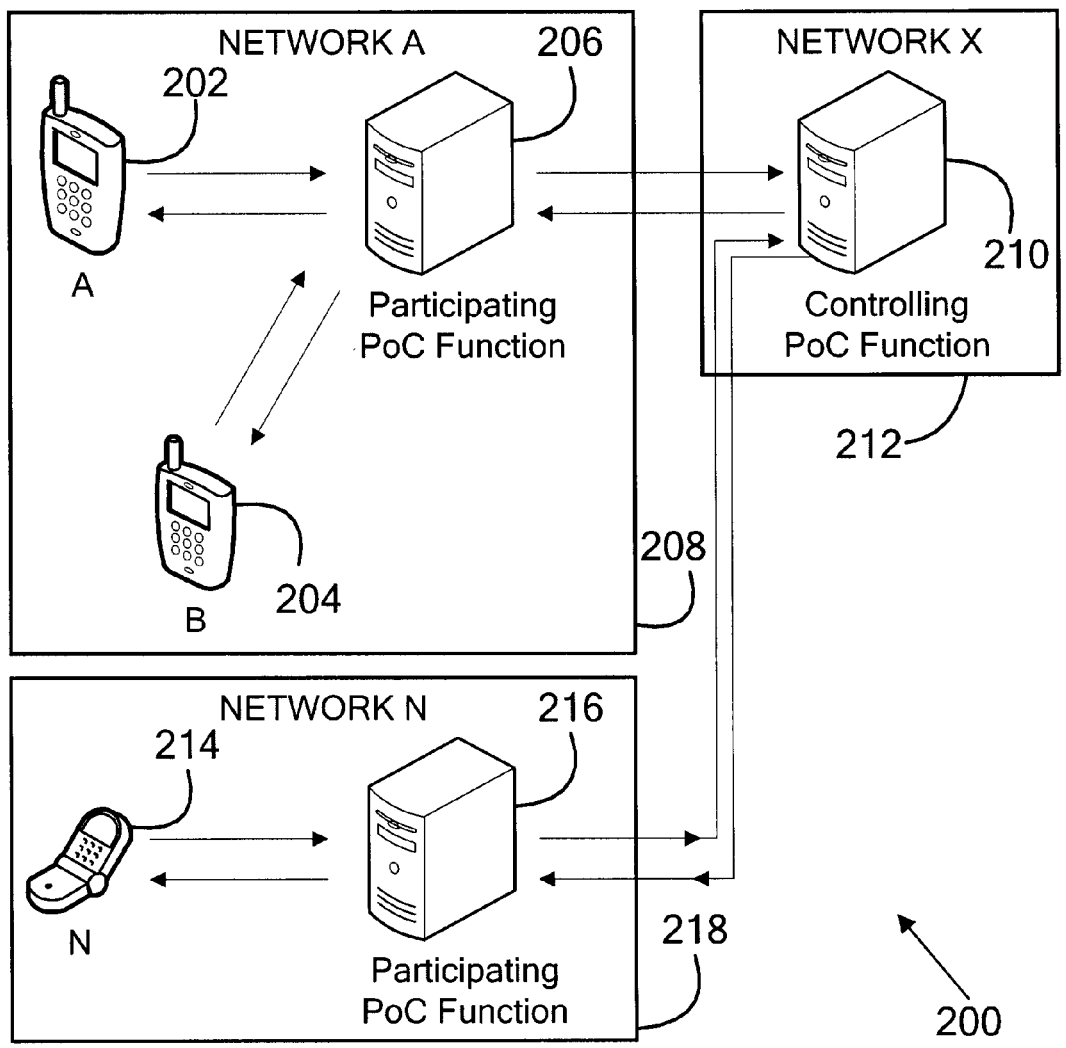
FIG. 2 illustrates a generic PoC architecture.

An example of a generic PoC architecture 200 is illustrated in FIG. 2. The terminals 202 and 204 are connected to their local Participant PoC Function (PPF) 206, located within their own local network 208, which is connected to the Controlling PoC Function (CPF) 210, located within a central network 212. Furthermore, the terminal 214 is connected to its local PPF 216 within its local network 218. The local PPF 216 is also connected to the CPF 210. Therefore, the terminals 202 and 204 are interconnected to the terminal 214 via the central network 212. The terminals 202, 204 and 214 participate to a common communication session controlled by the CPF 210. It should be noted that the architecture 200 can be also composed of a plurality of local networks such as 208 and 218, comprising a plurality of PPFs such as 206 and 216, connected to a plurality of terminals such as 202, 204 and 214.

1. Transcoding in a PoC Application
1.1 Elements to Consider for Enabling Transcoding in a PoC Application In the PoC version 1.0 standard [1] [14] [15], the need for transcoding is recognized but no detailed solution is given. It is said in [1] that transcoding may be performed by both the Controlling PoC Function (CPF) and/or the Participating PoC Function (PPF). A transcoding architecture that supports various configurations and use cases is therefore required. The overall solution should involve several elements such as:
1. System-level protocol flow, interaction between different entities such as clients or users, the transcoding server (TS), PoC servers, and modification of messages exchanged between the different entities.
2. Processing architecture of the Transcoding Server (the internal processing taking place in the TS).
3. Transcoding Interface (TI) between the Transcoding Server and the PoC Functions.

Figure 3:
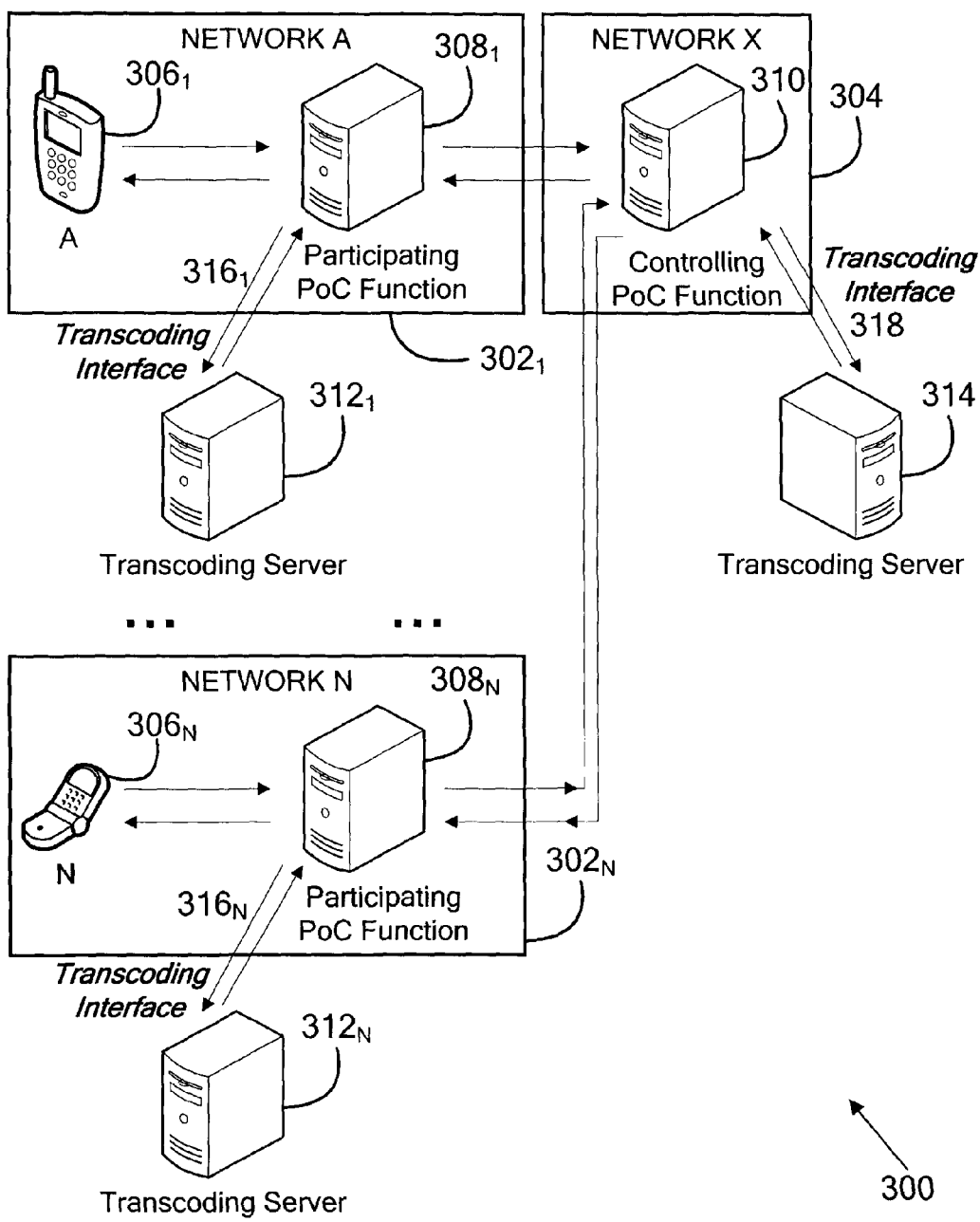
FIG. 3 illustrates a high-level architecture of the PoC application with transcoding in accordance with a first non-restrictive illustrative embodiment of the present invention.

These elements are illustrated in FIG. 3. More specifically, FIG. 3 illustrates a high-level architecture 300 of the PoC application, which is substantially similar to that of FIG. 2, but with transcoding capabilities. N local networks $302_1$ to $302_N$ are interconnected to each other via a central network 304. Each local network $302_n$, for $1 \leq n \leq N$, comprises a user's terminal $306_n$, connected to a PPF $308_n$. The central network 304 comprises a CPF 310 to which each PPF $308_n$ is connected. The connection between the different entities can be of different types such as wireless, wireline, using cables, etc. Furthermore, to each local network $302_n$ and to the central network 304, a transcoding server $312_n$ and 314 are connected respectively. More specifically, the transcoding server $312_n$ is connected to the PPF $308_n$ through a transcoding interface $316_n$. And the TS 314 is connected to the CPF 310 through the transcoding interface 318. Such a configuration 300 allows the N users $306_1$ to $306_N$ to participate in a common communication session, controlled by the central network element CPF 310 and where one user at the time can transmit media streams.

Moreover, FIG. 3 also illustrates a session flow between the different entities, for setting up the session. Once the session is active, the media flow may, for example, travel directly through the TS $312_n$ or pass by the CPF 310 and/or PPF $308_n$ prior to arriving at the TS $312_n$. Note that a PoC server may include the Controlling PoC Function (CPF), the Participating PoC Function (PPF) or both, i.e. the CPF and PPF may constitute a single server, although they are logically separate function-wise.

1.2 The Session Description Protocol

A Session Description Protocol (SDP) 400, as illustrated in FIG. 4, is a key element of SIP-based (Session Initiation Protocol) multimedia sessions and is defined in [13]. The SDP 400 comprises a plurality of fields which define a session's parameters. Each line corresponds to a field. The SDP 400 is contained within a SIP INVITE request [14], sent by a user when initiating a group session with the other users.

The following SDP parameters are especially of interest:
The IP address where the media stream is to be received is described with the field 'c=' on line 422, where, for example, an IPV6 address of 1000:900:800:700:600: efdf:2edf:3ece is illustrated.
The list of media characteristics is described with the field 'm=' on lines 424 and 432, showing, as an example, two medias in this session:
Audio over RTP (Real-Time Protocol) received at port 3456, with associated RTCP (Real-Time Control Protocol), is shown in line 424. For audio media, two codecs are offered and are tagged 97 and 98.
The talk burst control protocol (TBCP) received at port 2000 using UDP (User Datagram Protocol) is shown in line 432.
The details of these two medias are described in the field 'a=' on lines 426, 428, 430 and 434:
For audio media, the two tags 97 and 98 correspond to two distinct codecs, which are offered: the AMR codec or the EVRC codec at 8000 Hz as shown in lines 426 and 428.
RTCP at port 5560 is provided in line 430.
For TBCP, several options are provided in line 434.

2. The PoC Signaling Flow for the Transcoding Scheme Centralized at the Controlling PoC Function The PoC specification describes several types of sessions which may contain several invitation methods, which are described in the PoC specification produced by the Open Mobile Alliance (OMA) and which are not described here for conciseness. A person of ordinary skill in the art will be able to apply the present invention in a straightforward manner to all the cases supported by PoC standard.

In the first non-restrictive illustrative embodiment of the present invention, the case where the transcoding scheme is centralized at the Controlling PoC Function, is considered.

2.1 Roles of the Controlling PoC Function in a Session Flow

Figure 5:
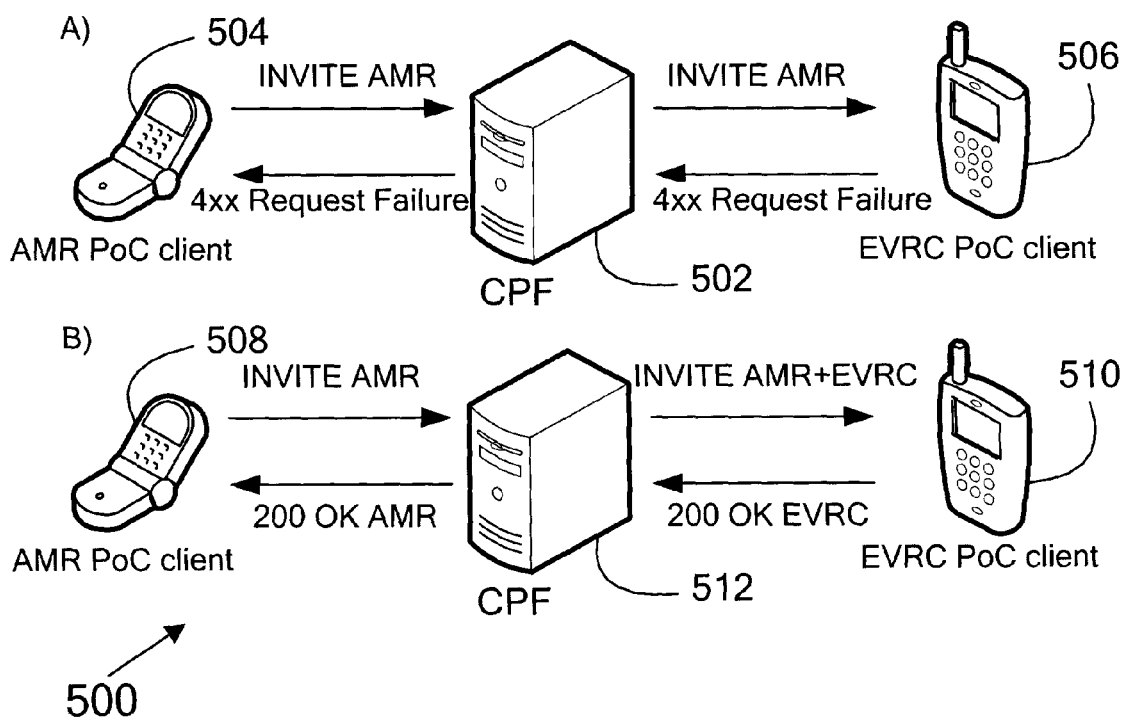
FIGS. 5A and 5B are schematic diagrams illustrating the role of the CPF in the PoC application to ensure a proper communication session, where in FIG. 5A the CPF does not support transcoding and in FIG. 5B the CPF supports transcoding.

In the first non-restrictive illustrative embodiment of the present invention as illustrated in FIG. 3, the whole transcoding process, in addition to the talk permissions, are managed by the CPF 310. Regardless of the type of PoC group session established, the CPF 310 has two main responsibilities:

1. Ensure Proper Session Offering and Setup Between the Users:

As PoC users may have incompatible formats/codecs, the CPF 310 may have to change the SDP 400 (see FIG. 4) offering to the various users in order to include formats/codecs that they can use during the group session and for which a proper transcoding to other formats/codecs is possible. For instance, a user supporting only AMR would not be able to establish a direct session with a user supporting only EVRC. A CPF supporting AMR-EVRC transcoding would include both EVRC and AMR in the session offerings. This is illustrated in the system 500 of FIG. 5, which outlines the role of the CPF to ensure a proper session offering. In the example A) of FIG. 5, a terminal 504 supporting only the AMR audio codec invites, with a session description (not shown), a terminal 506 supporting only the EVRC audio codec, to a communication session through the CPF 502, which does not alter the invitation's session description. An error "4xx Request Failure" is then generated by the terminal 506 since it can't support the offered AMR audio codec. In the example B), a terminal 508 supporting only the AMR audio codec invites, with a session description (not shown), a terminal 510 supporting only the EVRC audio codec to a communication session through the CPF 512, which now alters the session description of the invitation to meet with the capabilities of the terminal 510. Although the session description of the invitation, issued by the terminal 508, contains only the AMR audio codec, since the CPF 512 expands the session description to include also the EVRC audio codec for the terminal 510, the terminal 510 will accept the invitation by issuing a 200 OK response with the EVRC codec as the chosen codec. The CPF 512 will modify the invitation acceptation for the terminal 508 to include the AMR codec instead of the EVRC codec so that the session can take place between the terminals 508 and 510 and data can be exchanged between them.

2. Manage the Flow of Media Streams Between Users:

When transcoding is required, the media streams will have to flow through a Transcoding Server (TS) (not shown in FIG. 5), where they will be adapted/transcoded and then be sent to their destination. This requires that the flow of media streams be managed by the CPF 512. Regarding the media flow, two types of traffics have to be managed by the CPF 512: Talk Burst Control (TBC) and usual media. The first type relates to talk requests, such as requesting permissions to talk, and responses between the users and the CPF 512. The second type relates to the usual media streams containing useful information and actual data to be transferred (e.g. AMR over RTP and RTCP). Each type of traffic is assigned to some specific port numbers. Therefore, the CPF 512 and the TS comprise respectively at least a port for the TBC traffic, such as the TBCP (Talk Burst Control Protocol) port.

2.2 Roles of the Controlling PoC Function in the Media Flow

For the media flow, two options are possible. Therefore, two media flow schemes are considered and are illustrated in the architecture 600 of FIG. 6 and the architecture 700 of FIG. 7. As a non-limitative example, both FIGS. 6 and 7 are illustrating an architecture using AMR/EVRC transcoding.

Figure 6:
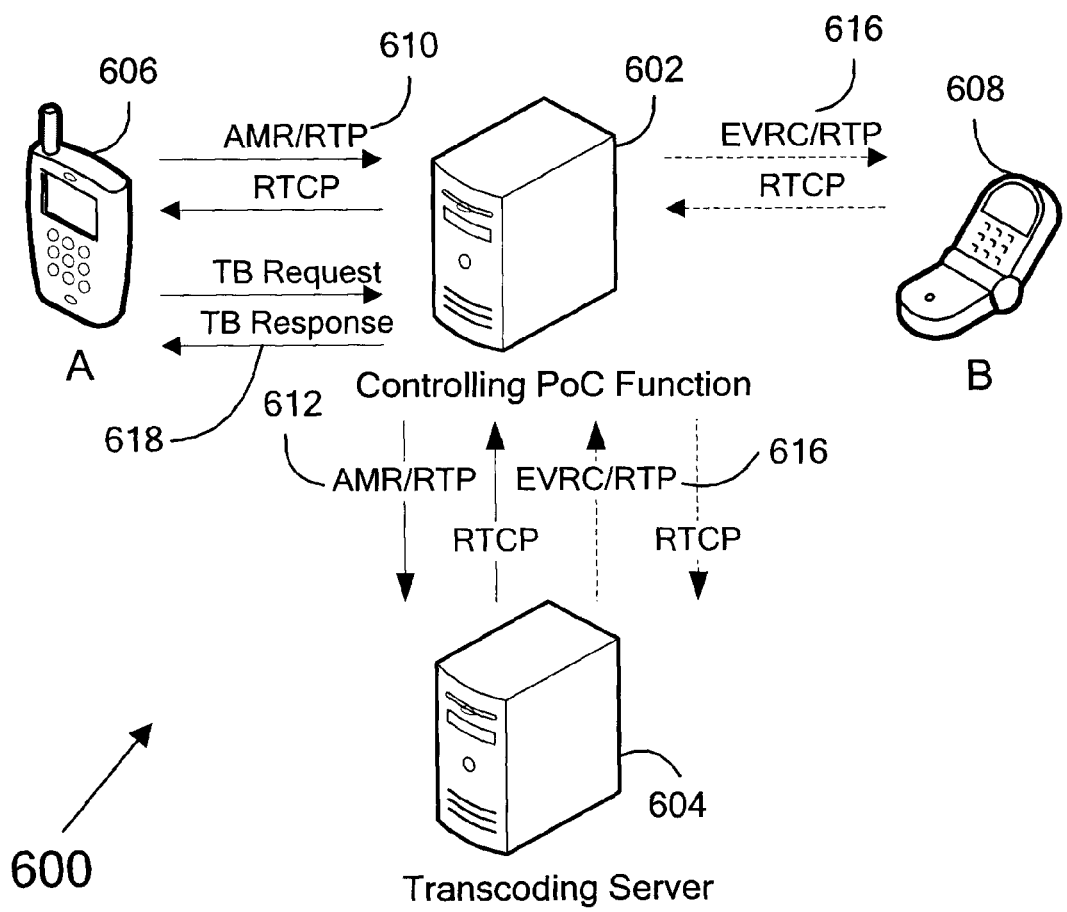
FIG. 6 illustrates a media flow of the transcoding scheme centralized at the CPF and where all the media packets arrive at the CPF before the TS (Transcoding Server) in the architecture of FIG. 3.

The first media flow scheme is illustrated in the architecture 600 of FIG. 6, when transcoding is centralized at the CPF 602 and where all the media packets arrive at the CPF 602 before the Transcoding Server (TS) 604. A user from a terminal 606, using an AMR codec, wants to communicate and exchange media streams with a user from a terminal 608, which uses an EVRC codec. The terminal 606 sends AMR packets over the Real Time Protocol (RTP) in a media flow 610 to the CPF 602. The CPF 602 sends those AMR packets over RTP in a media flow 612 to the TS 604 for adaptation and transcoding. The TS 604 returns the adapted EVRC packets over RTP in a media flow 614 back to the CPF 602, which then forwards them in a media flow 616 to the terminal 608. In another alternative, the TS 604 can directly send the adapted EVRC packets to the terminal 608, without going through the CPF 602.

While the CPF 602 forwards the usual media streams to the TS 604, it processes itself the TBC packets arriving at its TBCP port, from the terminal 606 and returns the results back to the terminal 606, in message flow 618. Indeed, the media flow 618, containing the TB requests and responses, is communicated between the terminal 606 and the CPF 602 only, without involving the TS 604 in the communication path.

Figure 7:
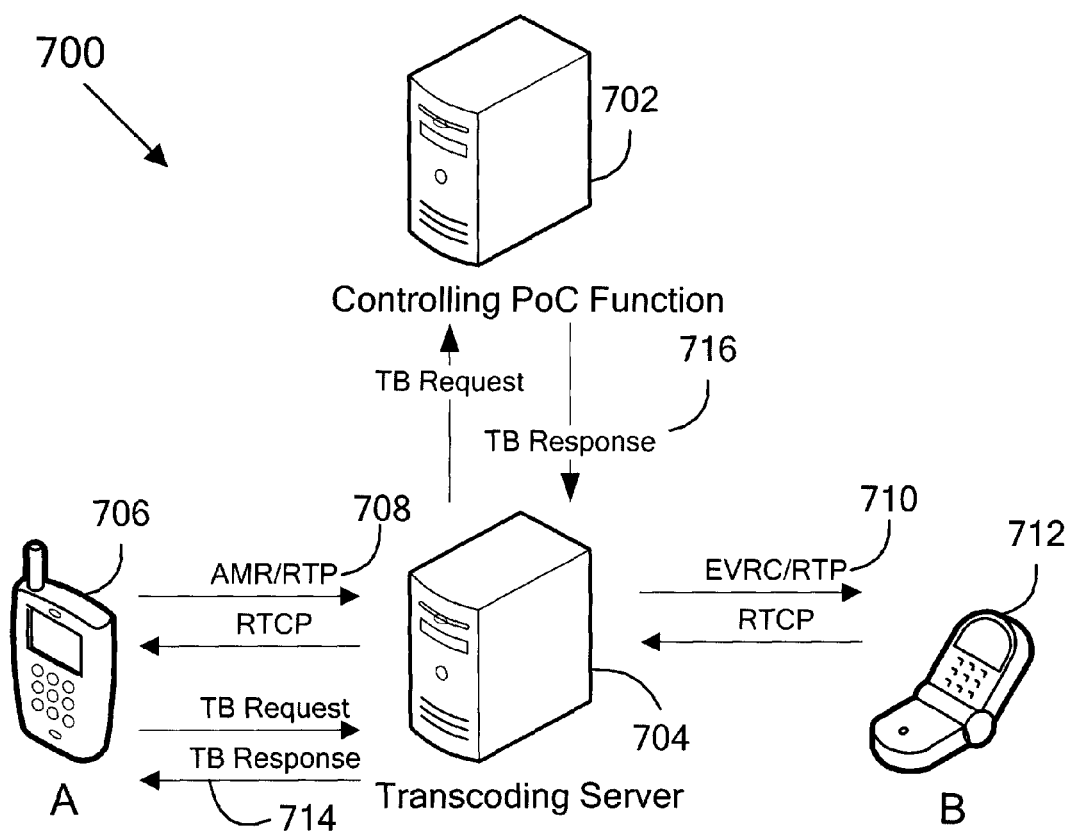
FIG. 7 illustrates a non-limitative example of media flow of the transcoding scheme centralized at the CPF and where all the media packets arrive at the TS before going to the CPF.

The second media flow scheme is illustrated in the architecture 700 of FIG. 7, when transcoding is centralized at the CPF 702 and where all the media packets arrive at the TS 704 before (or instead of) the CPF 702. A terminal 706 sends AMR packets over RTP in a media flow 708 to the TS 704. The TS 704 transcodes the AMR packets into EVRC packets and sends the thus adapted EVRC packets over RTP in a flow 710 to the terminal 712. A media flow 714 containing TB requests and responses is exchanged between the terminal 706 and the CPF 702 only via the TS 704. More specially, the TS 704 forwards the incoming packets of the media flow 714 to the outgoing packets of the media flow 716, to the CPF 702. And the TS 704 forwards the incoming packets of the media flow 716, from the CPF 702, to the outgoing packets of the media flow 714, to the terminal 706. In the same manner, the terminal 712 and the CPF 702 may exchange TB requests and responses with each other only via the TS 704.

Therefore, the TS 704 forwards the TBC packets arriving at its TBCP port to the CPF 702, while it transcodes the usual media streams and sends them to their destination, such as to the terminal 712. The CPF 702 manages the TBC messages arriving at its TBCP port and returns the responses to the TS 704, which forwards them to their destination, or alternatively, the CPF 702 returns the responses directly to their destination.

The architecture 700 of FIG. 7 is considered to be the preferred media flow scheme because it requires a lighter flow of packets between the TS 704 and the CPF 702.

2.3 Session Control Managed by the Controlling PoC Function

Figure 8:
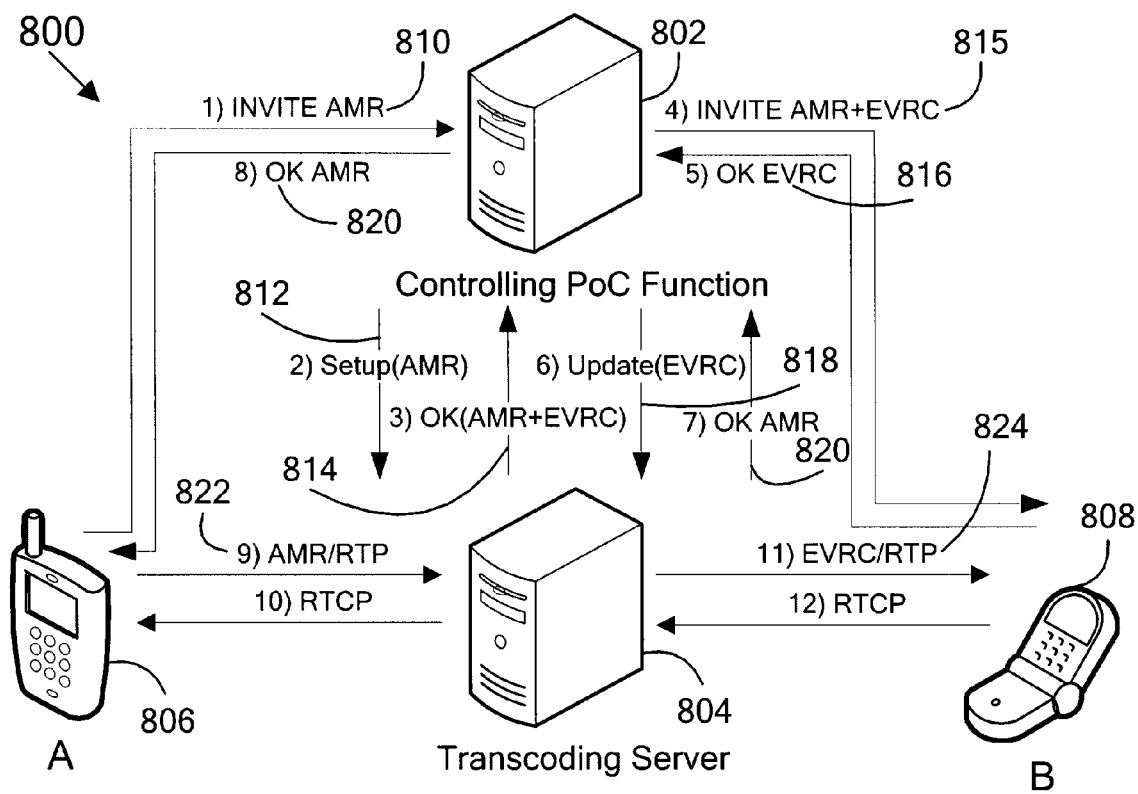
FIG. 8 illustrates a session control flow of the transcoding scheme centralized at the CPF of FIG. 7.

In addition to the media flow described above, a session control flow must also be managed/provided. The session control flow is illustrated in FIG. 8 and is managed by the CPF 802, which also has to manage the session itself. The session may impact the media flow. Indeed, after a communication session is set up, when the session parameters change, such as to account for a joining or departing of a user, or when a different user has the permission to talk, the CPF 802 has to inform the TS 804 of the situation so that proper transcoding and routing of the media streams can be performed.

More specifically, the architecture 800 of FIG. 8 illustrates a control flow taking place between the CPF 802, the TS 804 and the terminals 806 and 808 when setting up a session. In the architecture 800, interoperability between AMR and EVRC audio codecs is addressed as a non-limitative example. The setup of the session is as follows:

1. A user of the terminal 806 invites another user to a session by sending an invitation, with a session description containing its supported audio visual formats/codecs (such as the AMR codec) in message 810.
2. The CPF 802 receives the invitation, containing offered session media formats/codecs information and IP addresses and ports information, and requests the TS 804 in message 812 to set up a transcoding session and to provide a list of acceptable formats/codecs to offer to other users participating to the session.
3. The TS 804 sets up the transcoding resources and returns the IP addresses and ports information along with the formats/codecs information to the CPF 802 in message 814. In this particular example, the EVRC codec is added to the list.
4. The CPF 802 forwards the invitation with the enhanced media formats/codecs and IP addresses and ports information to the invited terminal 808 in message 815.
5. The terminal 808 accepts the invitation with its own supported codec (EVRC in the example) in message 816, destined to the CPF 802.
6. Upon receiving message 816, the CPF 802 requests the TS 804, in message 818, to update the transcoding session according to the information provided by the invited terminal 808, who has accepted the invitation; the information concerns the accepted formats/codecs and IP addresses and ports to be used for the terminal 808.
7. The TS 804 performs the requested operations and provides updated session information, to the CPF 802, including formats/codecs and IP addresses and ports information, in message 820.
8. The CPF 802 then informs the terminal 806 that the invitation has been accepted with the formats/codecs to be used, and supported by the terminal 806, in message 820.
9. The terminal 806 then obtains the permission to talk using the existing PoC mechanisms.
10. The terminal 806 starts sending AMR packets to the TS 804. Then in conformance with the architecture 700 of FIG. 7, the TS 804 transcodes the AMR packets to EVRC packets and forwards them to the terminal 808. If the architecture 600 of FIG. 6 were used instead, then the packets would first arrive at the CPF 802 prior to being transcoded in the TS 804. More details are provided in the detailed signaling flow in FIG. 10, which will be described herein below.

Figure 9:
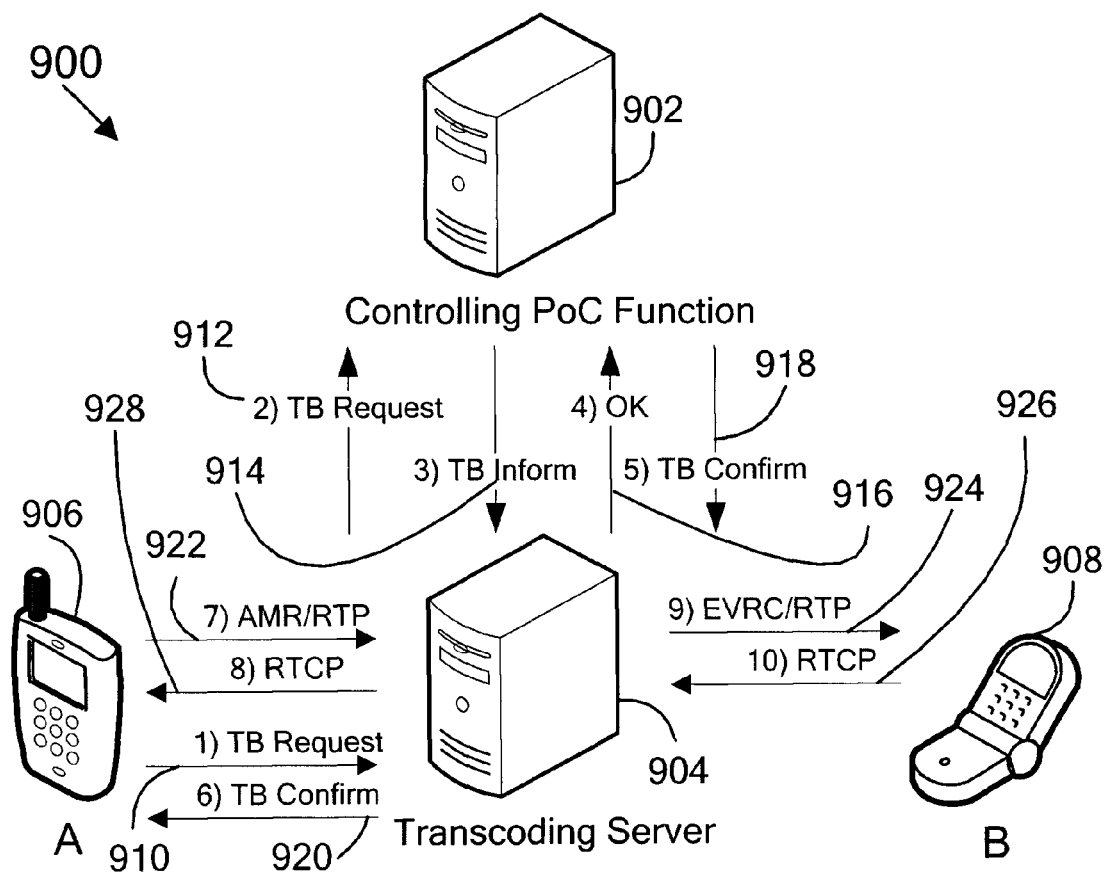
FIG. 9 illustrates a control flow for the case when a new participant has the permission to talk in the transcoding scheme centralized at the CPF of FIG. 7.

Referring now to FIG. 9, the architecture 900 illustrates an example of the control flow taking place between the CPF 902, the TS 904 and the users 906 and 908, when a user, such as 906, requests permission to talk. Generally it is assumed that initially no one has the permission to talk. The steps are as follows:

1. The terminal 906 requests permission to talk by issuing a TB (Talk Burst) request message 910. In this example, the media flow of FIG. 7 is assumed, but one of ordinary skill in the art can derive easily appropriate message flows for the media flow according to FIG. 6.
2. The TB request message 910 arrives at the TS 904 and is forwarded to the CPF 902 in message 912.
3. The CPF 902 informs the TS 904 that the user terminal 906 is asking permission to talk in message 914, so that the TS 904 can allocate transcoding resources properly and accordingly, as well as enforce proper control over media streams.
4. After the TS 904 confirms with the CPF 902 that the request is granted in message 916, the CPF 902 informs the user terminal 906 that his request to talk is granted by sending a TB Confirm message 918 to the TS 904, which forwards it in message 920 to the user terminal 906.
5. The user terminal 906 can then start sending AMR packets over RTP transport in media flow 922.
6. The media flow 922 arrives at the TS 904. The TS 904 transcodes the media information from AMR to EVRC formats and then sends the transcoded media to the user terminal 908 in media flow 924.
7. Then, RTCP reports for media 924, for example the number of packets received by the terminal 908, are sent from the terminal 908 to the TS 904 in media flow 926.
8. RTCP reports for media 922 are sent from the TS 904 to the user 906 in media flow 928.

The use of the AMR and EVRC codecs are only illustrative of the operations to perform in the architecture 900, which is not limited to them. The architecture 900 can support various formats/codecs and combinations of formats/codecs including combinations of audiovisual formats/codecs such as AMR, AVRC, H.263, MPEG-4 part 2, MPEG-4 part 10, etc. For instance, the architecture 900 may support transcoding of AMR/H.263 to and from EVRC/MPEG-4 part 2. Also, in the present application, the TB (Request/Confirm) messages flow between the TS 904 and the CPF 902, for illustration purposes only. In other modifications and embodiments of the present invention, an IP switch can be used to route such messages directly to the CPF 902, without having to go through the TS 904 for such operations.

2.4 Detailed Signaling Flow for Adaptation Centralized at the CPF

Figure 10:
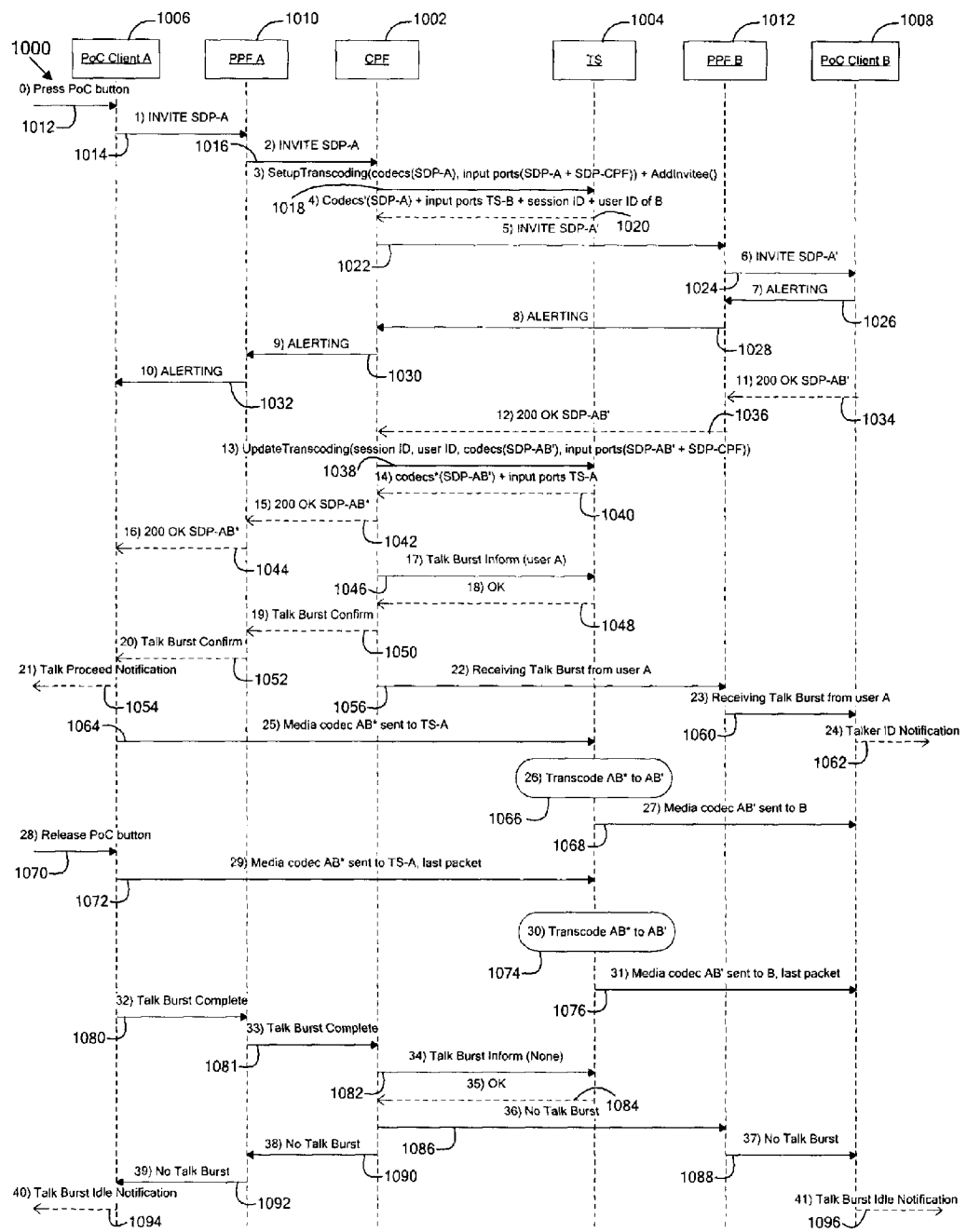
FIG. 10 illustrates a signaling flow for the transcoding scheme centralized at the CPF of FIG. 7.

Now referring to FIG. 10, the detailed signaling flow of the transcoding scheme centralized at the CPF is described. Several group session cases and their variants can be considered. However, this would make the present specification quite tedious to read without providing additional benefit. Therefore, a representative use case, provided with the corresponding detailed signaling flow will be described. This signaling flow can be applied in a straightforward manner to all the other cases by those of ordinary skill in the art.

In the following, the case of "Confirmed indication using On-demand Session with Manual answer described in the PoC specifications" will be presented. The signaling details regarding the SIP/IP core will not be described since they are obvious and would only increase the complexity of the flow without any benefit. In addition, the case where all the media packets arrive at the TS is considered. However, it would be straightforward for one of ordinary skill in the art to consider the case where they all arrive at the CPF.

FIG. 10 illustrates an exemplary embodiment 1000 of the detailed signaling flow between the CPF 1002, the TS 1004, the user terminals 1006 and 1008 with their respective PPFs 1010 and 1012, for the case of the transcoding scheme centralized at the CPF and where all the media streams arrive at the TS. The steps are as follows:

0. The PoC User 1006 presses the PoC Button of the corresponding PoC terminal to initiate a group session.
1. By doing so, the user 1006 issues a SIP INVITE method including a SDP information, noted SDP-A, in message 1014. The SIP INVITE first arrives at the PPF 1010 in the network of the user 1006 (for example, his home PPF). For instance, the SDP-A could include, as a non-limitative example:
c=IN IP6 FF1E:03AD::7F2E:172A:1E24
m=audio 3456 RTP/AVP 97
a=rtpmap: 97 AMR
a=rtcp:5560
m=application 2000 udp TBCP
a=fmtp:TCBP queuing=1; tb_priority=2; timestamp=1

2. The SIP INVITE is then sent from the PPF 1010 to the CPF 1002 in message 1016. The CPF 1002 can be on any network, such as the one of the user 1006, of the user 1008 or a different one.
3. The CPF 1002 contacts the TS 1004 to set up transcoding resources for the session in message 1018. The request includes the formats/codecs included in the SDP-A along with IP address and port information. The codec information is used to know the invitee's formats/codecs, such as the user 1008, and to determine which additional formats/codecs could be added to the session offering to other users. The IP address and port information is used to determine where the trancoded results from other users need to be sent after transcoding in order to reach the inviting client, the user 1006 in this case. Since all the media packets arrive at the TS 1004, the IP address and port information will also be used to determine where the Talk Burst (TB) responses, coming from the CPF 1002, need to be sent in order to reach the user 1006. Also, the IP address and port information of the CPF 1002 is needed in order for the inviting client (user 1006) to forward the Talk Burst requests to. For instance, if the IP address of the CPF 1002 is IP6 FF1E:03AD::7F2E:172A:1E28, then the information using SDP is provided as follows (although the interface doesn't need to use SDP):
c=IN IP6 FF1E:03AD::7F2E:172A:1E28
m=application 2002 udp TBCP Furthermore, the Setup Transcoding operation normally calls two TS API (Application Program Interface) methods: i) SetupTranscodingSession(SDP-A, SDP-CPF) and ii) Addinvitee(Session ID).

i) This first method initiates a new transcoding session. It creates a new Session ID context and memorizes the IP addresses and ports for reaching the user 1006 and the CPF 1002 for all its media. It also memorizes the media formats/codecs and protocols supported by the user 1006, the inviting party. The method returns a session ID. The reservation process inside the TS 1004 for the user 1006 is shown in dotted lines 1110 in FIG. 11.
   ii) The second method provides information to invite a new participant to the session ID. The method returns a user ID and IP address and ports where that user can send media streams and where the CPF 1002 can send the TB responses to this user through the TS 1004. All the information is updated in the Session ID's context.
4. Then, the TS 1004 will return the following information to the CPF 1002 in message 1020:
   For the call to SetupTranscodingSession(SDP-A, SDP-CPF) in message 1018, it will return a session ID for future references.
   For the call to Addinvitee(Session ID), it will return (as shown in short dashed lines 1116 in FIG. 11): a user ID for future references (such as users having accepted the invitation or departing users), list of formats/codecs to provide in the session offering to the invitee 1008 (i.e. list of formats/codecs between which the TS 1004 can support transcoding with the ones offered by the user 1006), list of addresses/input ports where the invited user 1008 can send his/her media for transcoding to other participants, list of addresses/input ports where the CPF 1002 can send Talk Burst responses to the TS 1004 for the invited user 1008.

The TS 1004 can provide the information using SDP as follows (although the interface doesn't need to use SDP): i) for inviting other participants:
c=IN IP6 FF1E:03AD::7F2E:172A:1E30
m=audio 53456 RTP/AVP 97 98
a=rtpmap: 97 AMR
a=rtpmap: 98 EVRC/8000
a=rtcp:53080
m=application 50000 udp TBCP
a=fmtp:TCBP queuing=1; tb_priority=2; timestamp=1
and ii) for sending the TB responses from the CPF 1002:
c=IN IP6 FF1E:03AD::7F2E:172A:1E30
m=application 53458 udp TBCP It should be noted that each time that the CPF 1002 wants to invite a new user to the session, it will have to make a call to Addinvitee(Session ID). Also, if all the media streams were to enter the CPF 1002 before going to the TS 1004 (the other option), the IP address and ports in step 3 (with message 1018), instead of corresponding to SDP-A would correspond to IP adresses and ports in the CPF 1002. Also, since there would not be any flow of TBCP between the CPF 1002 and TS 1004, the line 'm=' with media TBCP would not be present in the parameters. The TS 1004 would therefore know that it doesn't need to handle any Talk Burst Control Message (TBCM).

5. The information response received from the TS 1004 is processed by the CPF 1002 and a modified invitation SDP-A' is generated and then sent to the invitee 1008 through its PPF 1012 in message 1022.
6. The PPF 1012 forwards the received invitation to the PoC user 1008 in message 1024.
7. An Alerting message is sent from the user 1008 to its PPF 1012 in message 1026. The alerting message notifies the inviting user 1006 that the invited user 1008 has received the invitation but has not accepted it yet.
8. The Alerting message is then sent from the PPF 1012 to the CPF 1002 in message 1028.
9. The Alerting message is then sent from the CPF 1002 to the PPF 1010 of the user 1006 in message 1030.
10. The Alerting message is finally received by the user 1006, sent by the PPF 1010 in message 1032.
11. The user 1008 accepts the invitation and provides the selected media information in a SDP-AB' to its PPF 1012 in message 1034. For instance, the SDP-AB' could include:
c=IN IP6 FF1E:03AD::7F2E:172A:1E34
m=audio 5458 RTP/AVP 98
a=rtpmap: 98 EVRC/8000
a=rtcp: 5480
m=application 4000 udp TBCP
a=fmtp:TCBP queuing=1; tb_priority=2; timestamp=1
12. The message 1034 is forwarded by the PPF 1012 to the CPF 1002 in message 1036.
13. The CPF 1002 then contacts the TS 1004 to update the transcoding session in message 1038. The request actually involves the following two TS API methods:
Join(Session ID, User ID, SDP-AB', SDP-CPF) (shown in solid lines 1112 in FIG. 11): this method informs the TS 1004 that the user 1008 has accepted the invitation. It updates the Session ID context by memorizing the IP address and ports for reaching the user 1008 corresponding to User ID and the CPF 1002 for its entire media. It also memorizes the media formats/codecs and protocols supported by User ID, the joining party 1008. For instance, the CPF 1002 would have to provide information about its IP addresses and ports to which TB requests from User ID can be sent:
c=IN IP6 FF1E:03AD::7F2E:172A:1E28
m=application 2008 udp TBCP The reservation process inside the TS 1004 for the user 1008 is shown in solid lines 1112 in FIG. 11.

AcceptInvite(Session ID, SDP-AB', SDP-CPF): this method informs the TS 1004 that the invitation from the user 1006 has been accepted by at least one person. It updates the Session ID context by memorizing what formats/codecs the user 1006 is expected to use for each input port. The method returns IP addresses and ports where the user 1006 can send media streams along where the CPF 1002 can send the TB responses to the user 1006 through the TS 1004. The reservation process inside the TS 1004 for the user 1006 is shown in long dashed lines 1114 in FIG. 11.

14. The TS 1004 then returns the following information to the CPF 1002 in message 1040:
   The status of the request of the call to Join(Session ID, User ID, SDP-AB', SDP-CPF) performed in message 1038. The status would normally report the success of adding the new user to the session or the reasons why he could not be added.
   the returned parameters of the call to AcceptInvite(Session ID, SDP-AB', SDP-CPF) performed in message 1038 comprising: list of addresses/input ports where the user 1006 can send his/her media streams for transcoding to other participants' formats, the formats/codecs to be used, list of addresses/input ports where the CPF 1002 can send Talk Burst responses to the TS 1004 for the user 1006. The TS 1004 could provide the information using SDP as follows, shown in long dashed lines 1114 in FIG. 11, (although the interface doesn't need to use SDP): i) for transmitting data during the session to the user 1006:
   c=IN IP6 FF1E:03AD::7F2E:172A:1E3
   m=audio 48456 RTP/AVP 97
   a=rtpmap: 97 AMR
   a=rtcp: 48080
   m=application 48000 udp TBCP
   a=fmtp:TCBP queuing=1; tb_priority=2; timestamp=1
   ii) for sending the TB responses coming from the CPF 1002:
   c=IN IP6 FF1E:03AD::7F2E:172A:1E30
   m=application 48400 udp TBCP 15. The information response from the TS 1004 is processed by the CPF 1002, which then sends a modified invitation SDP-AB* for the inviting party 1006 through its PPF 1010 in message 1042. It basically includes the media formats/codecs to be used and the IP addresses and ports where to send the media streams.

16. The PPF 1010 forwards the invitation to the PoC user 1006 in message 1044.

17. The CPF 1002 informs the TS 1004 that the user 1006 has the permission to talk in message 1046. This can be done using the following API method: TalkBurstInform (Session ID, User ID). The information is updated in the Session ID's context.

18. The TS 1004 acknowledges the permission by sending message 1048 to the CPF 1002.

19. The CPF 1002 sends a Talk Burst Confirm destined to the user 1006 through its PPF 1010 in message 1050.

20. The PPF 1010 sends the Talk Burst Confirm to the user 1006 in message 1052.

21. The user 1006 is granted the right to talk in notification 1054.

22. The CPF 1002 sends a Receiving Talk Burst message to the user 1008 through its PPF 1012 in message 1056.

23. The PPF 1012 forwards the Receiving Talk Burst message in message 1060 to the user 1008.

24. The user 1008 is notified that the user 1006 was granted the right to talk in notification 1062.

25. Media streams travel from the user 1006 to the TS 1004 in media flow 1064. In the present illustrative embodiment, AMR packets are sent. It would be straightforward to show the case where the media streams travel through the CPF 1002 instead of the TS 1004. All it would take from the session initiation process (SIP) would be to provide different addresses and ports to the users, which would point to the CPF 1002 instead of the TS 1004, and IP addresses and ports of the CPF 1002 as output destinations to the TS 1004.

26. Then, the TS 1004 knows that the user 1006 has the right to talk and transcodes media streams from AMR to EVRC in operation 1066.

27. Then, the TS 1004 sends EVRC transcoded packets to the user 1008 in media flow 1068.

28. The user 1006 releases the PoC button.

29 to 41. The remaining steps are usual PoC operations and do not require further explanations, which concern transcoding the last packet sent by the user terminal 1006 and the end of the media stream transmission, indicated by a Talk Burst Idle Notification, after the user 1006 releases the PoC button.

However, subsequent re-pressing of the PoC button by one of the users 1006 and 1008 will be processed as described in the foregoing description, for example through operations 1046 (with Talk Burst Inform from the user who desires to transmit media streams) to 1076 of FIG. 10 (for transmitting and transcoding media streams), in order to allow the said one user to transfer media streams to the other participant(s). Operations 1070 to 1094 describe what happens in the signaling flow when the said one user releases the PoC button.

Figure 11:
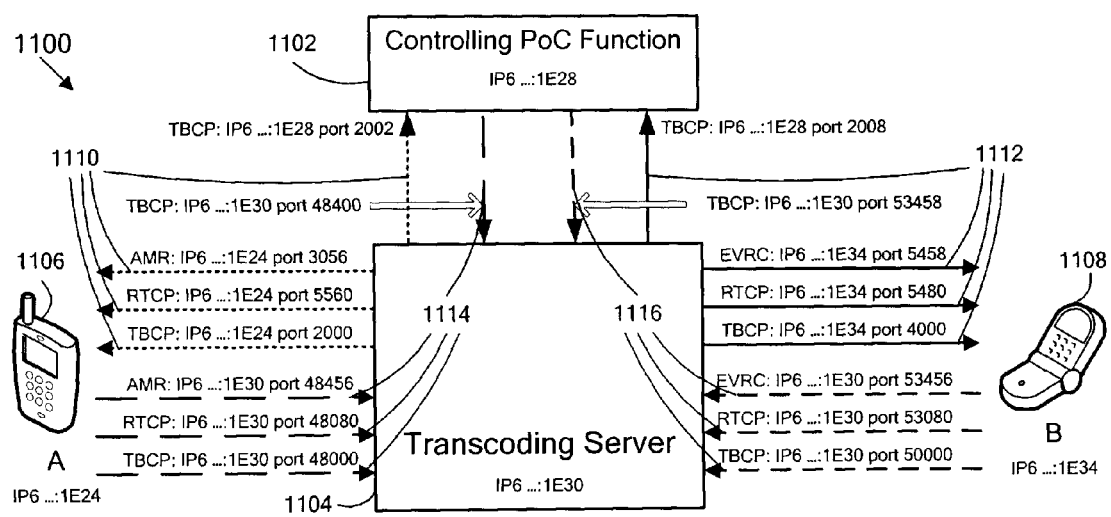
FIG. 11 illustrates an IP address and port routing setup between the Transcoding Server (TS), the CPF and the users' terminals for the transcoding scheme centralized at the CPF of FIG. 7.

The media flow architecture 1100 of FIG. 11 illustrates an exemplary embodiment of the routing of media flows through the CPF 1102 and the TS 1104 for the case of the transcoding scheme centralized at the CPF 1102. The input IP addresses and ports at the TS 1104 for media issued from the inviting terminal 1106, in addition to TBCP messages from the CPF 1102 to the terminal 1106, are illustrated in long dashed lines 1114. The input IP addresses and ports from the terminal 1106 are mapped to various types of media flows, such as codec, RTCP and TBCP, as illustrated in media flow 1114. Similarly, the input IP addresses and ports at the TS 1104 for media issued from the invited terminal 1108, in addition to TBCP messages from the CPF 1102 to the terminal 1108, are illustrated in short dashed lines 1116. The input IP addresses and ports from the terminal 1108 are mapped to various types of media flows, such as codec, RTCP and TBCP, as illustrated in media flow 1116. The destination IP addresses and ports at the TS 1104 for media to be sent to the inviting terminal 1106, in addition to TBCP messages to the CPF 1102 from the terminal 1106, are illustrated in dotted lines 1110. The input IP addresses and ports at the terminal 1106 are mapped to various types of media flows, such as codec, RTCP and TBCP, as illustrated in media flow 1110.

The destination IP addresses and ports at the TS 1104 for media to be sent to the invited terminal 1108, in addition to the IP addresses and ports for the TBCP messages destined to the CPF 1102 from the terminal 1108, are illustrated in solid lines 1112 in FIG. 11. The input IP addresses and ports at the terminal 1108 are mapped to various types of media flows, such as codec, RTCP and TBCP, as illustrated in media flow 1112. It should be observed that the TS 1104 has an IP address, in the example, which ends with "1E30" and is used for all incoming media flows shown in 1114 and 1116, although a different port is used for every distinct flow. For outgoing flows, an IP address ending with "1E24" is destined to the terminal 1106, an IP address ending with "1E28" is destined to the CPF 1102 and an IP address ending with "1E34" is destined to the terminal 1108.

Some further explanations and variations to the described illustrative embodiment require attention:

Case of multiple participants: in this case, for each participant to be invited, the CPF 1102 would have to make a call to AddInvitee(Session ID) prior to sending the SDP INVITE and a call to Join(Session ID, User ID, SDP-AB', SDP-CPF) once the user has accepted. When participants leave the session, the CPF 1102 has to make a call to Leave(Session ID, User ID) which updates the Session ID, taking into account the user ID that is leaving the session.

Case where all the media packets arrive at the CPF 1102: this alternative case was discussed hereinabove in reference to FIG. 10. All it would take from the session initiation process would be to provide different addresses and ports to the users, which point to the CPF 1002 instead of the TS 1004, and to provide the CPF 1002 IP addresses and ports as output destinations to the TS 1004. Also, when providing media information to the TS 1004, no TBCP media would be part of the session description since it would be fully managed by the CPF 1002. It should be noted that this is the 'safe' case to assume in PoC applications, as it is said in [1] section 9.12, where all the media flows must pass through the CPF 1002 (because of packet replication). However, the other case (where all the media streams arrive at the TS) is far more efficient and scalable as it delegates media handling to the TS 1004. In a way, the TS 1004 can be considered as being an extension of the CPF 1002.

Note that many variations can be made to the above described illustrative embodiment without departing from the nature and scope of the present invention. For instance, in a variation, the TBCP messages may not flow through the TS 1004. The TS behavior can be classified as being tightly controlled or loosely controlled. When tightly controlled, the TS 1004 either monitors TBCP messages to determine who has permission to talk or receives specific control messages from the CPF 1002. When loosely controlled, the TS 1004 knows who talks by monitoring media streams activity. The specific methods and APIs between the CPF 1002 and the TS 1004 may also be modified without departing from the scope of this invention. Furthermore, the media elements such as PPF 1006, CPF 1002, and TS 1004 are represented as distinct logical elements but in practice one or many of them may be combined together into a single server without departing from the scope of this invention.

3. The PoC Signaling Flow Where the Transcoding Scheme is at the Invited Participating PoC Function This sub-section presents a second non-restrictive illustrative embodiment of the present invention, where transcoding is performed at the PPF of the invited parties.

3.1 Roles of the Participating and Controlling PoC Functions

In the case where transcoding is performed at the invited PPF, the whole transcoding process is managed by the PPF, while the talk permissions and routing of media streams, including making copies of media packets, to each destination is still managed by the CPF. Regardless of the type of group session established, the PPF has two main responsibilities, which are essentially the same as those described in 2.1. First, the PPF ensures proper session offering and setup between the users. Secondly, the PPF manages the flow of media streams between the user and the CPF. It should be noted that although all the media streams must travel through the CPF, they do not have to travel through all the PPFs. However, the session control messages must pass through all the PPFs and the CPF.

The CPF's role is to: i) control who has permission to talk and ii) duplicate and route media packets of the talking user to the other users.

The main differences between the present case and the case where the transcoding scheme is centralized at the CPF are:

i) the PPF will control transcoding between the user and the CPF (so there is one user at the input and one at the output) while, in the previous case, the CPF had to control the transcoding to all destinations (many users). This is because the PPF is not allowed to duplicate packets to various destinations; the duplication can only be performed by the CPF.

ii) the PPF doesn't have to control who talks; the CPF still does it. Therefore the PPF control over the transcoding server can be done in 2 ways: a) loosely controlled—the transcoding server is always active and is always ready to perform transcoding once the session is set up, but some channels may be idle; b) tightly controlled—the PPF would listen to TBCM and inform the transcoding server to start or stop transcoding, alternatively, the PPF may analyze the TBCM and determine who has permission to talk.

In this second non-restrictive illustrative embodiment of the invention, the adaptation or transcoding is performed at the PPFs of the invited participants. The inviting terminal sends an invitation to other parties, containing its media session description. Each invited participant's PPF will perform the same operations as the CPF was doing in FIG. 8. This will lead to a situation where the inviting party's PPF doesn't have to perform transcoding but it is the responsibility of the PPF of the other parties participating in the session (e.g. the invited users). Therefore, media in formats supported by the inviting party will flow within the CPF. The computing resources required for transcoding in the system can be reduced if many invited parties participating to the session support the inviting party's media formats.

Figure 12:
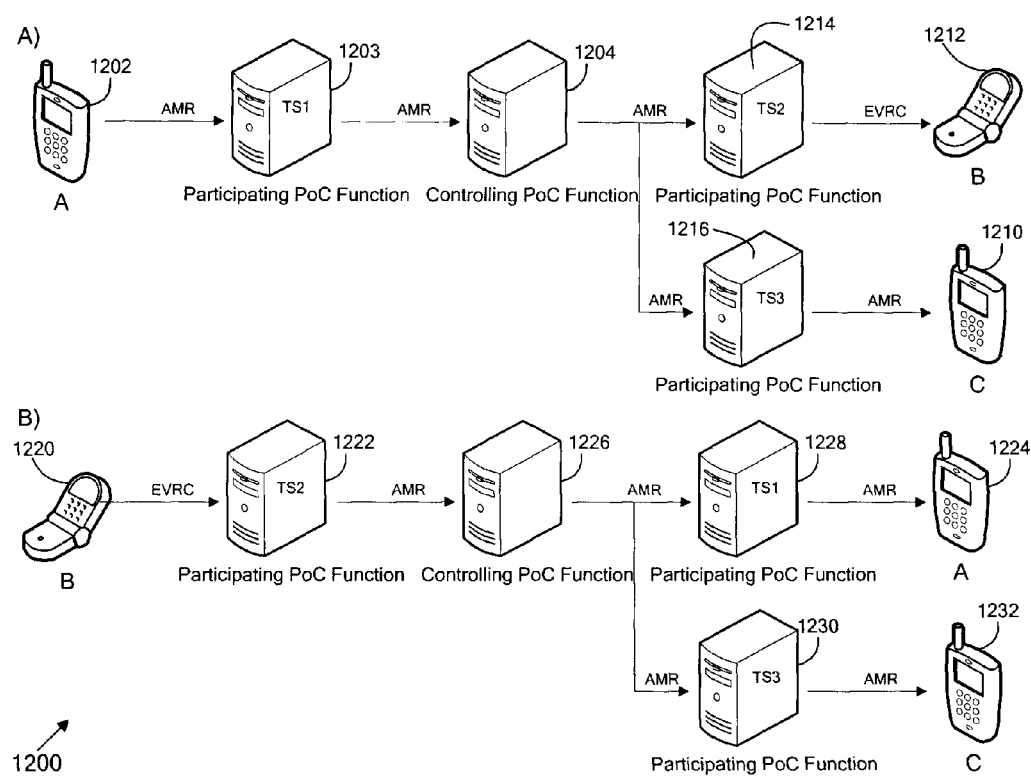
FIG. 12 illustrates an architecture of the transcoding scheme performed at the invited users' PPFs in accordance with a second non-restrictive illustrative embodiment of the present invention.

FIG. 12 illustrates an exemplary architecture 1200 for transcoding at the invited parties' PPF. In the case A), transcoding is made at the receiving PPF. The inviting terminal 1202, who has permission to talk, sends media streams in its supported format (AMR in this particular example). Such streams, in the format supported by the inviting terminal 1202 and agreed upon session establishment, flow within the CPF 1204. The invited parties' PPFs 1214 and 1216 receive the media streams in the format supported by the terminal 1202 and then transcode them as required to meet capabilities of the invited terminals 1212 and 1210. In this example, the PPF 1214 forms a TS that transcodes the received media streams from AMR to EVRC for the user 1212 while the PPF 1216 doesn't have to perform any transcoding for the user 1210, since the terminal of the user 1210 already supports AMR.

It should be noted that in this example, the elements 1202, 1212 and 1214, each forms a combination of a PPF and TS incorporated into a single server.

As also illustrated in FIG. 12, the case B) corresponds to the case where transcoding happens at the sending and receiving PPFs. The user 1224 initiates a group session and invites the users 1232 and 1220 to participate in. The invited user 1220 has the permission to talk. The PPF 1222 transcodes the media flow from the format supported by the user 1120 to those supported by the inviting terminal 1224 and agreed upon during session establishment. For instance, the PPF 1222 transcodes from EVRC to AMR since AMR is the format supported by the inviting terminal 1224 and agreed upon during the session establishment and thus flowing within the CPF 1226. The PPF 1228 of the inviting terminal 1224 performs no transcoding. The PPF 1230 normally performs transcoding for the invited terminal 1232. However, since the media flow provided by the CPF 1226 is in the format supported by the invited terminal 1232, then the PPF 1230 establishes that no transcoding needs to be performed. In fact, since the terminal 1232 supports the same format/codec agreed upon during session establishment for the terminal 1224 and flowing within the CPF 1226, then no transcoding at the terminal 1232 is needed to and from the terminal 1232, regardless of who is talking. For instance, in this example, AMR will always flow within the CPF 1226 and since AMR is also supported by the terminal 1232, then the PPF 1230 will have to perform no transcoding. Again, the elements 1222, 1228 and 1230, each forms a combination of a PPF and TS incorporated into a single server.

In the remaining description, the formats supported by the inviting terminal and agreed upon session establishment (thus flowing within the CPF) will be called "common stream format" (CSF).

3.2 Media Flow and Types of Traffics Managed by the Participating PoC Function

For media flows, similarly to the case where the transcoding scheme is centralized at the CPF, two schemes can be considered, as illustrated in FIGS. 6 and 7, with the following modification however: instead of a CPF 602 or 702, a PPF is interacting with the TS 604 or 704. The main difference, besides the fact that the TS interacts with the PPF instead of the CPF, is that TB requests arriving at the PPF or TS would be forwarded to the CPF and TB responses would come from the CPF before arriving at the PPF or TS.

3.3 Session Control Managed by the Participating PoC Function

The PPF has very little session management responsibilities. For instance, unlike the CPF, a local PPF does not have to care if new users join or leave the session, as long as the session is still in progress and the user it serves is still participating, since it only manages the transcoding from and to the CSF for a given user. Also it doesn't have to manage who has permission to talk; in the worst case it only monitors it.

Therefore the session flow of FIG. 8 and the control flow of FIG. 9 would still apply for this case, except that the TBCM are also routed to/from the CPF and that the TS would be replaced by an invited party's PPF.

3.4 Detailed Signaling Flow for Adaptation Centralized at the PPF

The detailed signaling flow for the case of transcoding performed at the PPF would be very similar to the case where transcoding is centralized at the CPF. FIG. 10 would remain the same, except that the interaction with the transcoding server would be handled at each invited party's PPF. The rule is that the PPF of each invited terminal has to perform transcoding from/to that terminal's supported media format to/from the CSF. This also requires session description changes by the invited party's PPF in order to allow session establishment. This is done in the same way as the CPF 1002 in FIG. 10 was doing. The function calls to the TS 1004 would also be similar.

4. Transparent PoC Transcoding

This section describes a third non-restrictive illustrative embodiment of the present invention, where transcoding is transparent PoC transcoding. Transparent transcoding means that the PoC terminals and servers are not aware that transcoding is taking place and behave as any conventional PoC entity would do in a context where no transcoding is performed. The Transcoding Server is inserted as a proxy in the communication path. The main advantage of this approach is that it does not require any modification to existing PoC terminals and servers. Indeed, an operator who has already deployed a PoC system can add PoC transcoding without any change to the already deployed PoC terminals and servers. This approach has been proven effective to smoothly introduce transcoding in the Multimedia Messaging Service.

4.1 Transparent PoC Transcoding Centralized at the CPF

In this embodiment, the Transcoding Server (TS) is placed in a central location of the network, so it is co-located with the CPF and can therefore take advantage of being placed in this unique manner with respect to the CPF. The TS is placed after the CPF in the media path but prior to it in the session control path. Furthermore, all the media packets (usual media and TBCP) travel through the CPF, which is located before the TS in the media stream flow.

Figure 13:
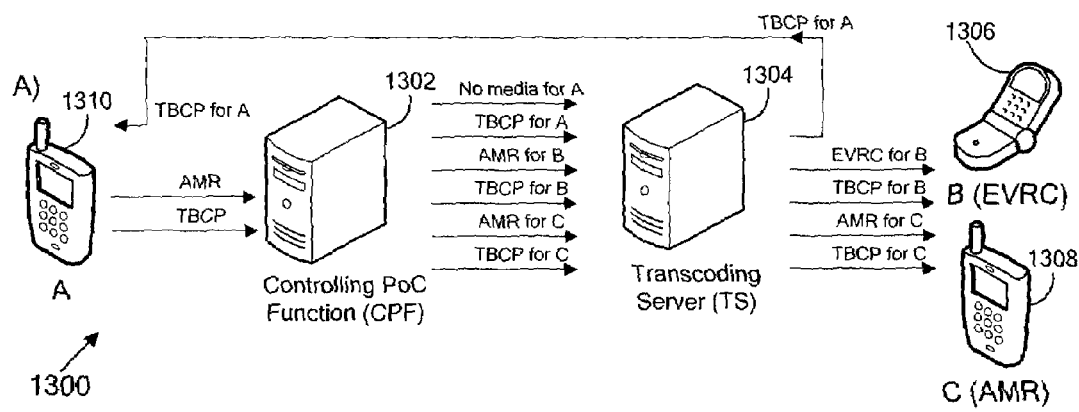
FIG. 13 illustrates an architecture of the transparent transcoding scheme centralized at the CPF in accordance with a third non-restrictive illustrative embodiment of the present invention.

The architecture 1300 of FIG. 13 illustrates an exemplary architecture for transparent transcoding at the CPF 1302. The CPF 1302, being in the media path, will make copies of the usual incoming media stream(s) and attempt to distribute it (them) to the other users in the session. Each of those output streams will enter the TS 1304 and will individually be transcoded as needed to meet the destination terminal capabilities and be distributed to each destination terminal 1306 and 1308 afterwards. TBCP packets will also enter the TS 1304, which will forward them to their destinations. The TS 1304 can learn who has permission to talk by either monitoring the content of TCBP packets sent from the CPF 1302, or by identifying the incoming usual media streams, which are inactive (since the talking user is the one for which there is no media streams delivered by the CPF 1302). Based on that, the TS 1304 will decide on the transcoding operations to perform for each destination. For instance, if the talking person uses the AMR codec, then AMR to EVRC needs to be performed for a user supporting the EVRC codec; but no transcoding is needed if the talking person uses the EVRC codec, instead of the AMR one.

Furthermore, in FIG. 13, the CPF 1302 makes copies, for all destination users, of the AMR streams obtained from the user 1310. The TS 1304 intercepts those media streams and transcodes them to suit the capabilities of the destination users 1306 and 1308 and sends the transcoded media streams to their destination. Thus, AMR media destined to the terminal 1306 entering the TS 1304 becomes EVRC media for the terminal 1306 at the output of the TS 1304, while AMR media destined to the terminal 1308 at the input of the TS 1304 remains AMR media for the terminal 1308 at the output of the TS 1304. The TS 1304 also forwards the unchanged TBCP messages to each destination user 1306 and 1308.

For the media streams to travel through the CPF 1302 and then through the TS 1304, certain SDP modifications have to be made, during the session establishment process. The CPF 1302 will be given IP address and port information of the TS 1304, regarding where to send information. The users will be given IP address and port information of the CPF 1302, regarding where to send information. The TS 1304 manages the connection between those sets of IP addresses and ports and where the different entities expect to receive their data.

Figure 14:
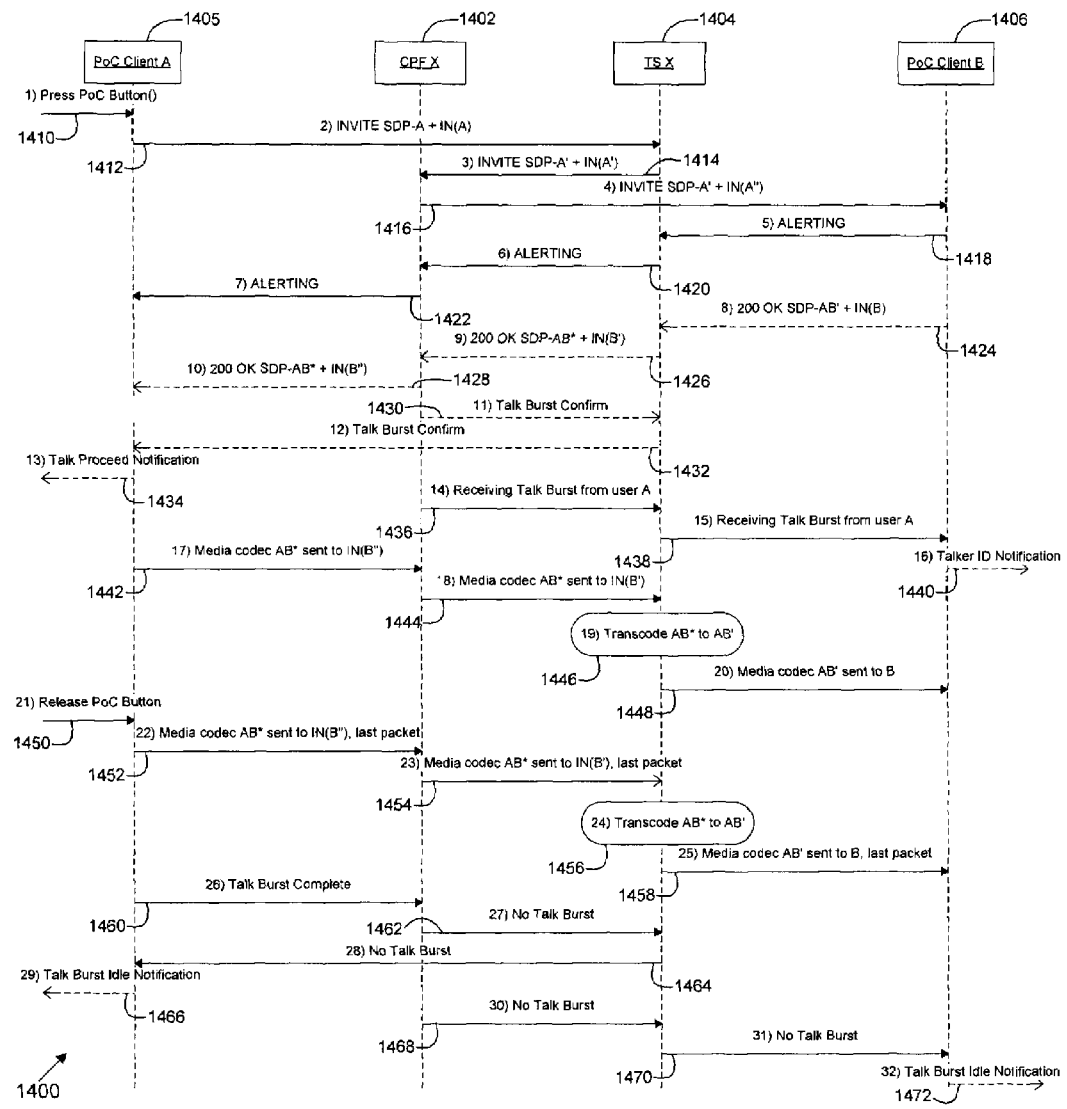
FIG. 14 illustrates a signaling flow of the transparent transcoding scheme centralized at the CPF of FIG. 13.
Figure 15:
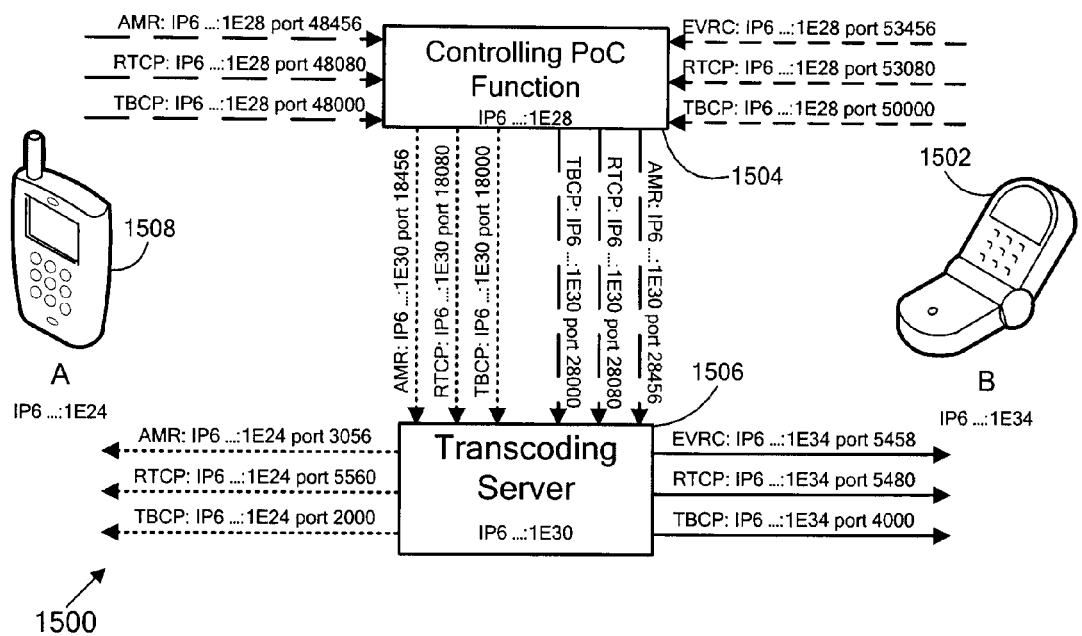
FIG. 15 illustrates an exemplary IP address and port routing setup between the TS, the CPF and the users' terminals of the transparent transcoding scheme centralized at the CPF of FIG. 13.

FIG. 14 illustrates an exemplary embodiment of the detailed signaling flow between the CPF 1402, the TS 1404 and the terminals 1405 and 1406, for the case of transparent transcoding centralized at the CPF 1402. The PPFs of the terminals 1405 and 1406 are not illustrated in order to simplify the description without however any loss of generality. In the following, the session offering changes, such as offered formats/codecs, from the CPF 1402 to the TS 1404, in rerouting of the media stream procedure, are described. The signaling flow is as follows:

1. The PoC User 1405 presses the PoC Button to initiate a group session in operation 1410.
2. The PoC user 1405 issues a SIP INVITE method, including a session description with a SDP information in message 1412. The SIP INVITE is intercepted by the TS 1404, which can be, for example, located in the same network as the CPF 1402. For instance, the SDP-A could include:
   c=INP6 FF1E03AD::7F2E:172A:1E24
   m=audio 3456 RTP/AVP 97
   a=rtpmap: 97 AMR
   a=rtcp:5560
   m=application 2000 udp TBCP
   a=fmtp:TCBP queuing=1; tb_priority=2; timestamp=1
3. The TS 1404 changes the formats/codecs and the IP address and port information provided by the user 1405 so that any media stream destined to the user 1405 will arrive first at the TS 1404, before being delivered to the user 1405 (see the dotted lines in FIG. 15). It also stores binding information between the new offered SDP and the SDP initially offered by the user 1405. In addition, the TS 1404 enhances the session description by adding media formats/codecs, for which it can support transcoding from and to the ones offered by the user 1405. Then, the TS 1404 sends the invitation with the updated SDP session description to the CPF 1402 in message 1414. For instance, the SDP provided by the TS 1404 could be:
   c=IN IP6 FF1E:03AD::7F2E:172A:1E30
   m=audio 18456 RTP/AVP 97 98
   a=rtpmap: 97 AMR
   a=rtpmap: 98 EVRC/8000
   a=rtcp:18080
   m=application 18000 udp TBCP
   a=fmtp:TCBP queuing=1; tb_priority=2; timestamp=1
   One should note the substitution of IP addresses from the user 1405 to the TS 1404 in line "c=" and the addition of EVRC codec in line "a=".
4. The CPF 1402 receives the SDP session description, modifies it so that media streams first pass through it. It then sends the modified invitation to the user 1406 in message 1416. The CPF 1402 also knows the mapping of IP addresses and ports so it can forward incoming packets to the right destination. For instance, it could be as illustrated in FIG. 15 (see short dashed lines):
   c=IN IP6 FF1E:03AD::7F2E:172A:1E28
   m=audio 53456 RTP/AVP 97 98
   a=rtpmap: 97 AMR
   a=rtpmap: 98 EVRC/8000
   a=rtcp:53080
   m=application 50000 udp TBCP
   a=fmtp:TCBP queuing=1; tb_priority=2; timestamp=1
5. An Alerting message 1418 is sent from the user 1406 to the TS 1404.
6. The Alerting message 1420 is sent from the TS 1404 to the CPF 1402.
7. The Alerting message 1422 is sent from the CPF 1402 to the user 1405.
8. The user 1406 accepts the invitation and provides the selected media information in SDP-AB' in message 1424. The request is intercepted by the TS 1404. For instance, the SDP-AB' could include:
   c=IN IP6 FF1E:03AD::7F2E:172A:1E34
   m=audio 5458 RTP/AVP 98
   a=rtpmap: 98 EVRC/8000
   a=rtcp: 5480
   m=application 4000 udp TBCP
   a=fmtp:TCBP queuing=1; tb_priority=2; timestamp=1
9. The TS 1404 reserves transcoding resources and ports and provides a modified SDP session to the CPF 1402 in message 1426. For instance the SDP could be:
   c=IN IP6 FF1E:03AD::7F2E:172A:1E30
   m=audio 28456 RTP/AVP 97
   a=rtpmap: 97 AMR
   a=rtcp: 28080
   m=application 28000 udp TBCP
   a=fmtp:TCBP queuing=1; tb_priority=2; timestamp=1
10. The information response is further modified by the CPF 1402 to include itself first in the media path. The CPF 1402 then sends the modified response to the user 1405 in message 1428. For instance, the SDP could be:
    c=INIP6 FF1E:03AD::7F2E:172A:1E28
    m=audio 48456
    a=rtpmap: 98 EVRC/8000
    a=rtcp:48080
    m=application 48000 udp TBCP
    a=fmtp:TCBP queuing=1; tb_priority=2; timestamp=1
11. The "Talk Burst Confirm" message for the user 1405 is initiated by the CPF 1402 in message 1430 and arrives at the TS 1404 (since it is next after the CPF 1402 in the media path).
12. The "Task Burst Confirm" message is sent to the user 1405 from the TS 1404 in message 1432.
13. The "Talk proceed" notification is sent to the user 1405 in notification 1434.
14. Receiving the "Talk burst" from the user 1408 in message 1436, to the user 1406 is initiated from the CPF 1402 and arrives at the TS 1404, since it is next after the CPF 1402 in the media path.
15. Receiving the "Talk burst" from the user 1405 in message 1438 is sent from the TS 1404 to the user 1406.
16. The "talker ID" notification is sent to the user 1406 in notification 1440.
17. Media packets sent in flow 1442 from the user 1405 arrive at the CPF 1402 since it is the first in the media path (see the long dashed lines in FIG. 15).
18. The CPF 1402 duplicates the received media streams as required and forwards the duplicated media streams to the TS 1404 in media flow 1444.
19. The TS 1404 transcodes the streams as needed in operation 1446.
20. The TS 1404 forwards the adapted and transcoded media streams to the user 1406 in media flow 1448.
21. The rest of the signaling flow is straightforward. When the user 1406 talks, the media flow from the user 1406 to the user 1408 is as illustrated in short dashed and dotted lines in FIG. 15.

When multiple terminals are involved in a session, the CPF 1402 and the TS 1404 perform SDP modifications to modify the path of media streams in a similar way for each joining terminal (so that the CPF 1402 is first in the path and the TS 1404 is next). Both the TS 1404 and the CPF 1402 are also aware of which IP addresses and ports pairs belong to which session description in order to perform the right transcoding and routing.

It is important to note that while the CPF 1402 is before the TS 1404 in the media flow, the TS 1404 is always before the CPF 1402 in the session flow. This can be ensured by using an IP switch in the network, so that each SIP packet with the CPF 1402 as destination not coming from the TS 1404 is routed to the TS 1404. Indeed, every session control message destined to the CPF 1402 first travels through the TS 1404, which can modify its content.

Finally, FIG. 15 illustrates a routing example of IP addresses between the CPF 1504, the TS 1506, and the terminals 1502 and 1508, during a transcoding session setup. The incoming traffic to the CPF 1504 has an IP address ending with "1E28". The incoming traffic to the TS 1506 has an IP address ending with "1E30". And the outgoing traffic from the TS 1506 destined to the terminal 1508 has an IP address ending with "1E24". Regarding the outgoing traffic from the TS 1506 destined to the terminal 1502, the outgoing traffic uses an IP address ending with "1E34"

Many modifications and other embodiments of the present invention will come to mind to those of ordinary skill in the art to which this invention pertains having described several implementation alternatives for architectures and signaling flows. Therefore, it is to be understood that the invention is not to be limited to the specific embodiments disclosed and that modifications and other embodiments are intended to be included within the scope of the appended claims. Although specific terms are employed herein, they are used to clarity the implementation in the scope of the PoC service and not for purposes of limiting the scope of the present invention in any way.

Although the present invention has been described in the foregoing specification by means of non-restrictive illustrative embodiments, these embodiments can be modified at will within the scope of the appended claims without departing from the spirit and nature of the subject invention.

REFERENCES

[1] Open Mobile Alliance, "Push to Talk Over Cellular (PoC)—Architecture. OMMD_PoC-V1_0-20041117-D."
[2] 3GPP TS 26.235, "Packet switched conversational multimedia applications; Default codecs (Release 6)."
[3] 3GPP2 S.R0100-0, "Push to Talk Over Cellular (PoC) System Requirements."
[4] 3GPP TS 23.228, "IP Multimedia Subsystem (IMS); Stage 2."
[5] 3GPP TS 24.229, "IP Multimedia Call Control based on SIP and SDP; Stage 3."
[6] 3GPP2 X.S0013.2, "IP Multimedia Subsystem (IMS); Stage 2."
[7] 3GPP2 X.S0013.4, "IP Multimedia Call Control Protocol, Based on SIP and SDP stage 3."
[8] 3GPP TS 23.218, "Multimedia (IM) session handling; stage 2."
[9] IETF RFC 3435, "Media Gateway Control Protocol; version 1."
[10] IETF RFC 3525, "Gateway Control Protocol; version 1."
[11] ITU Recommendation H.248, "Gateway control protocol."
[12] E. Burger and Guy Redmill, "Media Services in the IMS: Evolution for Innovation," *Brooktrouth Technology*, May 2005.
[13] IETF RFC 2327, "SDP: Session Description Protocol."
[14] Open Mobile Alliance, "Push to Talk Over Cellular (PoC)—Control Plane Document. OMA-TS-PoCControlPlane-V1_0."
[15] Open Mobile Alliance, "Push to Talk Over Cellular (PoC)—User Plane. OMA-TS-PoC-UserPlane-V1_0."

What is claimed is:

1. A method for establishing a multi-user communication session, having a session description, between at least three terminals having incompatible media characteristics, the method comprising:

inviting users with terminals having incompatible media characteristics to participate in the communication session;

setting up a transcoding session enabling transcoding between the incompatible media characteristics of the terminals based on information about the terminals of the users having accepted the invitation, said information comprising the media characteristics of the users' terminals;

establishing the session description according to the transcoding session;

during the communication session, transcoding media streams from the terminal of one user according to the transcoding session and transmitting the transcoded media streams according to the session description to the other users participating in the communication session, using the media characteristics of the terminals of said other users; and during the communication session, updating the transcoding session as new users join the communication session based on information about the terminals of the new users and as participating users leave the communication session.

2. A method as defined in claim 1, wherein inviting users with terminals having incompatible media characteristics to participate in the communication session comprises transmitting an invitation request with the session description from a first user to a central network element.

3. A method as defined in claim 2, wherein the session description comprises describing at least one media characteristic supported by the terminal of the first user.

4. A method as defined in claim 3, wherein the described supported media characteristic is a specific codec.

5. A method as defined in claim 2, wherein setting up the transcoding session comprises receiving a request from the central network element to set up the transcoding session through a transcoding server.

6. A method as defined in claim 5, wherein setting up a transcoding session further comprises establishing transcoding resources and media stream flows passing through the transcoding server.

7. A method as defined in claim 6, wherein establishing transcoding resources comprises providing the transcoding session information containing at least one of the following elements: a session identification, a list of formats and codecs supported by the transcoding server for transcoding, and a list of IP addresses and ports to allow the media streams to flow through the transcoding server.

8. A method as defined in claim 7, wherein setting up the transcoding session enabling transcoding between the incompatible media characteristics based on information provided by the users having accepted the invitation further comprises updating the transcoding session information with the session identification, the IP addresses and ports, and the formats and codecs of the terminals of the users having accepted the invitation.

9. A method as defined in claim 8, wherein updating the transcoding session information further comprises updating the transcoding resources and media stream flows passing through the transcoder server based on the information provided by each user who has accepted the invitation.

10. A method as defined in claim 9, wherein updating the transcoding resources and media stream flows comprises determining a transcoding operation to perform and the port and the IP address to which a transcoded media stream is sent.

11. A method as defined in claim 8, wherein establishing the session description comprises updating the session description according to the updated transcoding session information.

12. A method as defined in claim 6, wherein establishing the media stream flows comprises establishing talk burst packet and media packet flows.

13. A method as defined in claim 12, wherein the talk burst packets comprise talk requests and responses between the users and the central network element.

14. A method as defined in claim 13, comprising supplying all the media stream flows to the transcoder server.

15. A method as defined in claim 14, wherein the media packets are transcoded at the transcoding server and the talk burst packets are forwarded to the central network element.

16. A method as defined in claim 14, further comprising supplying all the media stream flows to the central network element.

17. A method as defined in claim 16, wherein only the media packets are forwarded to the transcoding server for transcoding.

18. A method as defined in claim 6, comprising managing the media stream flows, a communication session flow and a transcoding procedure through the central network element.

19. A method as defined in claim 18, wherein the transcoding procedure is further managed by local networks in which are located users' terminals and the talk permissions are managed by the central network element.

20. A system for establishing a multi-user communication session, having a session description, between at least three terminals having incompatible media characteristics, the system comprising:
  means for inviting users with terminals having incompatible media characteristics to participate in the communication session;
  means for setting up a transcoding session enabling transcoding between the incompatible media characteristics of the terminals based on information about the terminals of the users having accepted the invitation, said information comprising the media characteristics of the users' terminals;
  means for establishing the session description according to the transcoding session;
  during the communication session, means for transcoding media streams from the terminal of one user according to the transcoding session and transmitting the transcoded media streams according to the session description to the other users participating in the communication session, using the media characteristics of the terminals of said other users; and
  during the communication session, means for updating the transcoding session as new users join the communication session based on information about the terminals of the new users and as participating users leave the communication session.

21. A system for establishing a multi-user communication session, having a session description, between at least three terminals having incompatible media characteristics, the system comprising:
  a network element for inviting users with terminals having incompatible media characteristics to participate in the communication session; and
  a transcoding server for setting up a transcoding session enabling transcoding between the incompatible media characteristics of the terminals based on information about the terminals of the users having accepted the invitation, said information comprising the media characteristics of the users' terminals;
  wherein:
  the transcoding server establishes the session description according to the transcoding session;
  during the communication session, the transcoding server transcodes media streams from the terminal of one user according to the transcoding session and transmits the transcoded media streams according to the session description to the other users participating in the communication session, using the media characteristics of the terminals of said other users; and
  during the communication session, the transcoding server updates the transcoding session as new users join the communication session based on information about the terminals of the new users and as participating users leave the communication session.

22. A system as defined in claim 21, wherein the network element is a central network element.

23. A system as defined in claim 22, wherein the central network element manages media stream and communication session flows.

24. A system as defined in claim 22, wherein the central network element receives an invitation request from a first user.

25. A system as defined in claim 24, wherein the session description comprises at least one media characteristic supported by the first user.

26. A system as defined in claim 25, wherein the supported media characteristic is a specific codec.

27. A system as defined in claim 26, wherein the transcoding server further provides a transcoding session information.

28. A system as defined in claim 24, wherein the transcoding server intercepts the invitation request from the first user to the central network element.

29. A system as defined in claim 28, wherein the transcoding server further acts as a proxy server in the communication path between the central network element and the first user.

30. A system defined in claim 28, wherein the transcoding server is independent of the central network element and a local network element of the first user.

31. A system as defined in claim 28, wherein the transcoding server further establishes transcoding resources and media stream flows passing through the transcoding server.

32. A system as defined in claim 31, wherein the transcoding server further provides a transcoding session information.

33. A system as defined in claim 32, wherein the transcoding session information comprises at least one of the following elements: a session identification, a list of formats and codecs supported by the transcoding server for transcoding, and a list of IP addresses and ports to allow the media streams to flow through the transcoding server.

34. A system as defined in claim 33, wherein the transcoding server further updates the transcoding session information with information provided by the users having accepted the invitation to participate to the communication session.

35. A system as defined in claim 34, wherein the transcoding server further updates the transcoding resources and media stream flows based on the information provided by the users having accepted the invitation to participate to the communication session.

36. A system as defined in claim 35, wherein, during the transcoding session, the transcoding server determines a transcoding operation to perform and the port and IP address to which a transcoded media stream is sent.

37. A system as defined in claim 28, wherein the transcoding server uses an IP switch to intercept messages from the central network element.

38. A system as defined in claim 22, wherein the transcoding server receives a request from the central network element to set up the transcoding session.

39. A system as defined in claim 38, wherein the transcoding server further establishes transcoding resources and media stream flows passing through the transcoding server.

40. A system as defined in claim 39, wherein the media streams comprise talk burst packets and media packets.

41. A system as defined in claim 40, wherein the talk burst packets comprise talk requests and responses exchanged between the users and the network element.

42. A system as defined in claim 40, comprising means for supplying all the media streams to the transcoder server.

43. A system as defined in claim 42, wherein the transcoding server transcodes the media packets and forwards the talk burst packets to the network element.

44. A system as defined in claim 43, wherein the central network element informs the transcoding server which participating user has permission to talk.

45. A system as defined in claim 43, wherein the transcoding server deduces which participating user has permission to talk by looking into the talk burst packets.

46. A system as defined in claim 42, comprising means for supplying all the media streams to the central network element.

47. A system as defined in claim 46, comprising means for forwarding only the media packets to the transcoding server for transcoding.

48. A system as defined in claim 38, wherein the transcoding session information comprises at least one of the following elements: a session identification, a list of formats and codecs supported by the transcoding server for transcoding, and a list of IP addresses and ports to allow the media streams to flow through the transcoding server.

49. A system as defined in claim 48, wherein the transcoding server further updates the transcoding session information with information about the terminals of the users having accepted the invitation provided by said users having accepted the invitation.

50. A system as defined in claim 49, wherein the transcoding server further updates the transcoding resources and media stream flows based on the information provided by the users having accepted the invitation.

51. A system as defined in claim 50, wherein, during the transcoding session, the transcoding server determines a transcoding operation to perform and the port and IP address to which a transcoded media stream is sent.

52. A system as defined in claim 50, wherein the transcoding server updates the session description according to the transcoding session information.

53. A system as defined in claim 21, wherein the network element comprises a local network element of each user participating in the multi-user communication session.

54. A system as defined in claim 53, wherein the transcoding server comprises a plurality of transcoding servers, each transcoding server being connected to a respective local network element of an associated user participating in the communication session.

55. A system as defined in claim 54, wherein the local network element of each user participating in the communication session manages the transcoding server associated thereof.

56. A system as defined in claim 55, comprising a central network element that manages talk permissions and media flows.

57. A system as defined in claim 53, comprising means for supplying an invitation request from a first user to the local network element of this first user.

58. A system as defined in claim 57, wherein the session description comprises at least one media characteristic supported by the first user.

59. A system as defined in claim 58, wherein the supported media characteristic is a specific codec.

60. A system as defined in claim 53, wherein the transcoding server receives a request from the local network element of the first user to set up the transcoding session.

61. A system as defined in claim 60, wherein the transcoding server further establishes transcoding resources and media stream flows passing through the transcoding server.

62. A system as defined in claim 61, wherein the transcoding server further provides a transcoding session information.

63. A system as defined in claim 62, wherein the transcoding session information comprises at least one of the following elements: a session identification, a list of formats and codecs supported by the transcoding server for transcoding, and a list of IP addresses and ports to allow the media streams to flow through the transcoding server.

64. A system as defined in claim 63, wherein the transcoding server further updates the transcoding session information with information about the terminals of the users having accepted the invitation provided by said users having accepted the invitation.

65. A system as defined in claim 64, wherein the transcoding server further updates the transcoding resources and media stream flows based on the information provided by the users having accepted the invitation.

66. A system as defined in claim 65, wherein, during the transcoding session, the transcoding server determines a transcoding operation to perform and the port and IP address to which a transcoded media stream is sent.

* * * * *